US009189635B2

(12) United States Patent
Hori et al.

(10) Patent No.: US 9,189,635 B2
(45) Date of Patent: Nov. 17, 2015

(54) COMPUTER SYSTEM AND ITS CONTROL METHOD

(75) Inventors: Koichi Hori, Odawara (JP); Shun Kameoka, Odawara (JP); Masami Maeda, Odawara (JP); Nobuyuki Osaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 376 days.

(21) Appl. No.: 13/061,647

(22) PCT Filed: Feb. 8, 2011

(86) PCT No.: PCT/JP2011/000701
§ 371 (c)(1),
(2), (4) Date: Mar. 1, 2011

(87) PCT Pub. No.: WO2012/107955
PCT Pub. Date: Aug. 16, 2012

(65) Prior Publication Data
US 2012/0203978 A1    Aug. 9, 2012

(51) Int. Cl.
*G06F 12/00* (2006.01)
*G06F 21/60* (2013.01)
*G06F 21/62* (2013.01)
*G06F 3/06* (2006.01)

(52) U.S. Cl.
CPC ............ *G06F 21/604* (2013.01); *G06F 3/067* (2013.01); *G06F 3/0622* (2013.01); *G06F 3/0637* (2013.01); *G06F 21/6218* (2013.01)

(58) Field of Classification Search
CPC  G06F 12/0233; G06F 12/023; G06F 12/0646
See application file for complete search history.

(56) References Cited

U.S. PATENT DOCUMENTS 7,380,094 B2    5/2008  Igarashi et al.
2006/0143425 A1  6/2006  Igarashi et al.
(Continued)

FOREIGN PATENT DOCUMENTS

JP    2006-185386 A    7/2006

OTHER PUBLICATIONS

PCT International Search Report and Written Opinion on application PCT/JP2011/000701 dated Oct. 26, 2011; 13 pages.
(Continued)

*Primary Examiner* — Sanjiv Shah
*Assistant Examiner* — Arvind Talukdar
(74) *Attorney, Agent, or Firm* — Foley & Lardner LLP

(57) ABSTRACT

A computer system and its control method capable of allocating resources to a plurality of users in a balanced manner and ensuring information security between the users even when the plurality of users are made to extensively manage a storage system are provided.
The storage system includes: a plurality of resource groups defined by grouping of a plurality of resources; a storage area for storing management information of the plurality of resource groups and association information between the plurality of resources and the plurality of resource groups; and a plurality of user groups defined by grouping of the plurality of users, each of the user groups being allocated to at least one of the plurality of resource groups; wherein based on login of at least one user from among the plurality of users, a management device has the storage system execute operation permitted by an authority granted to the user group, to which the relevant user belongs, on the resource group allocated to the user group.

7 Claims, 45 Drawing Sheets

(56) References Cited

U.S. PATENT DOCUMENTS

2006/0212673 A1    9/2006  Fukuguchi et al.
2008/0215813 A1    9/2008  Igarashi et al.
2008/0301382 A1*  12/2008  Miki ..................... G06F 3/0605
                                                    711/154

OTHER PUBLICATIONS

Ferraiolo, David F.; Role-Based Access Control (RBAC): Features and Motivations; Proceedings of $11^{th}$ Annual Computer Security Applications Conference, Dec. 11-15, 1995; 8 pages.

* cited by examiner

| LDEV ID | ASSIGNED RESOURCE GROUP ID | VALIDITY FLAG |
|---|---|---|
| 0x000000 | 0x0000 | 0(INVALID) |
| 0x000001 | 0x0000 | 0(INVALID) |
| 0x000002 | 0x0000 | 0(INVALID) |
| : | : | : |

| LDEV ID | ASSIGNED RESOURCE GROUP ID | VALIDITY FLAG |
|---|---|---|
| 0x000000 | 0x0000 | 1(VALID) |
| 0x000001 | 0x0000 | 1(VALID) |
| 0x000002 | 0x0000 | 1(VALID) |
| : | : | : |

| Parity Group ID | ASSIGNED RESOURCE GROUP ID | VALIDITY FLAG |
|---|---|---|
| 0x000000 | 0x0000 | 0(INVALID) |
| 0x000001 | 0x0000 | 0(INVALID) |
| 0x000002 | 0x0000 | 0(INVALID) |
| : | : | : |

| Parity Group ID | ASSIGNED RESOURCE GROUP ID | VALIDITY FLAG |
|---|---|---|
| 0x000000 | 0x0000 | 1(VALID) |
| 0x000001 | 0x0000 | 1(VALID) |
| 0x000002 | 0x0000 | 1(VALID) |
| ... | ... | ... |

| Host Group ID | ASSIGNED RESOURCE GROUP ID | VALIDITY FLAG |
|---|---|---|
| 0x000000 | 0x0000 | 0(INVALID) |
| 0x000001 | 0x0000 | 0(INVALID) |
| 0x000002 | 0x0000 | 0(INVALID) |
| ... | ... | ... |

| Host Group ID | ASSIGNED RESOURCE GROUP ID | VALIDITY FLAG |
|---|---|---|
| 0x000000 | 0x0000 | 1(VALID) |
| 0x000001 | 0x0000 | 1(VALID) |
| 0x000002 | 0x0000 | 1(VALID) |
| ... | ... | ... |

| Port ID | ASSIGNED RESOURCE GROUP ID | VALIDITY FLAG |
|---|---|---|
| 0x000000 | 0x0000 | 0(INVALID) |
| 0x000001 | 0x0000 | 0(INVALID) |
| 0x000002 | 0x0000 | 0(INVALID) |
| : | : | : |

| Port ID | ASSIGNED RESOURCE GROUP ID | VALIDITY FLAG |
|---|---|---|
| 0x000000 | 0x0000 | 1(VALID) |
| 0x000001 | 0x0000 | 1(VALID) |
| 0x000002 | 0x0000 | 1(VALID) |
| : | : | : |

| RESOURCE GROUP ID | RESOURCE GROUP NAME | LOCKED LOGIN SESSION ID |
|---|---|---|
| 0x0000 | RSG0 | |
| 0x0001 | RSG1 | 0101 |
| 0x0002 | RSG2 | 0101 |
| 0x0003 | RSG3 | 0101 |
| 0x0004 | RSG4 | |
| .. | .. | |
| 0x0011 | RSG11 | 0101 |
| 0x0012 | RSG12 | 0101 |
| .. | .. | |
| 0xFFFF | ALL_RSG (FIXED) | |

| USER ID | USER NAME | USER GROUP ID BITMAP | |
|---|---|---|---|
| 0x0000 | User0 | 1000 0000 0000 0000 0000 0000 0000 0000 | ← BELONG TO UG0 |
| 0x0001 | User1 | 0100 0000 0000 0000 0000 0000 0000 0000 | |
| 0x0002 | User2 | 0010 0000 0000 0000 0000 0000 0000 0000 | ← BELONG TO UG2 |
| .. | .. | .. | |
| 0x0011 | User11 | 0000 0000 0000 0000 0100 0000 0000 0000 | ← BELONG TO UG11 |
| 0x0012 | User12 | 0000 0000 0000 0000 0010 0000 0000 0000 | ← BELONG TO UG12 |
| .. | .. | .. | |
| 0x0020 | User20 | 0000 0000 0011 0000 1000 0000 0000 0000 | ← BELONG TO THREE UGS |
| .. | .. | .. | |

| USER GROUP ID | USER GROUP NAME | AUTHORITY BITMAP |
|---|---|---|
| 0x0000 | UG0 | 0010 0000 0000 .... |
| 0x0001 | UG1 | 0100 0100 0000 .... |
| 0x0002 | UG2 | 0000 0110 0100 .... |
| .. | .. | .. |
| 0x0011 | UG11 | 0000 0010 1100 .... |
| 0x0012 | UG12 | 0000 0010 1100 .... |
| .. | .. | .. |

FIG. 15

| AUTHORITIES | THINGS USER CAN DO |
|---|---|
| Support Personnel | SYSTEM MAINTENANCE |
| User Maintenance | SIMPLE SYSTEM MAINTENANCE BY USER |
| Security | USER REGISTRATION (CREATION OF USER GROUP (UG)) <br> GENERAL CRYPTOGRAPHIC KEY OPERATION <br> CREATION/DELETION OF RESOURCE GROUP (RSG) <br> ASSOCIATION BETWEEN UG AND RSG |
| Audit Log | AUDIT LOG MANAGEMENT |
| Initial Configuration | REFERENCE TO STORAGE APPARATUS <br> INITIALIZATION OF STORAGE MANAGEMENT SOFTWARE <br> LICENSE MANAGEMENT OF PROGRAM PRODUCTS |
| System | REFERENCE TO STORAGE APPARATUS <br> CLPR CREATION/DELETION <br> OWNERSHIP SETTING <br> PORT ATTRIBUTE SETTING |
| Provisioning | LDEV CREATION/DELETION <br> POOL / POOL VOL CREATION/DELETION <br> DP VOL CREATION/DELETION <br> LU PATH CREATION/DELETION <br> HOST GROUP CREATION/DELETION <br> HOST ADDITION/DELETION |
| Performance Monitor | PERFORMANCE MONITOR SETTING <br> START/STOP PERFORMANCE MONITOR |
| Local Copy | ENVIRONMENT SETTING <br> PAIR CREATION/DELETION |
| Remote Copy | ENVIRONMENT SETTING <br> PAIR CREATION/DELETION |
| ... | |

| USER GROUP ID | USER GROUP NAME | RESOURCE GROUP ID BITMAP |
|---|---|---|
| 0x0000 | UG0 | 1111 1111 1111 1111 1111 |
| 0x0001 | UG1 | 0000 0100 0000 0000 0000 |
| 0x0002 | UG2 | 0111 0000 0000 0000 0110 |
| . . | . . | . . |
| 0x0011 | UG11 | 0001 0000 0000 0000 0100 |
| 0x0012 | UG12 | 0001 0000 0000 0000 0010 |
| . . | | . . |

| # | SESSION ID | RESOURCE GROUP ID BITMAP | AUTHORITY BITMAP | ETC. |
|---|---|---|---|---|
| 1 | 0101 | 1111 1111 1111 1111 | 0010 0000 0000 | |
| 2 | 0102 | 0111 0000 0000 0110 | 0000 0110 0100 | |
| ... | | | | |

← SESSION INFORMATION ESTABLISHED BY USER0

| LDEV ID | ASSIGNED RESOURCE GROUP ID | VALIDITY FLAG |
|---|---|---|
| 0x000000 | 0x0002 | 1(VALID) |
| 0x000001 | 0x0002 | 1(VALID) |
| 0x000002 | 0x0002 | 1(VALID) |
| 0x000003 | 0x0002 | 1(VALID) |
| 0x000004 | 0x0002 | 1(VALID) |
| 0x000005 | 0x0002 | 1(VALID) |
| 0x000006 | 0x0002 | 1(VALID) |
| 0x000007 | 0x0002 | 1(VALID) |
| 0x000008 | 0x0002 | 1(VALID) |
| 0x000009 | 0x0002 | 1(VALID) |
| 0x00000A | 0x0002 | 1(VALID) |
| 0x00000B | 0x0002 | 1(VALID) |
| 0x00000C | 0x0002 | 1(VALID) |
| 0x00000D | 0x0002 | 1(VALID) |
| 0x00000E | 0x0002 | 1(VALID) |
| 0x00000F | 0x0002 | 1(VALID) |
| 0x000010 | 0x0002 | 1(VALID) |
| 0x000011 | 0x0002 | 1(VALID) |

| Parity Group ID | ASSIGNED RESOURCE GROUP ID | VALIDITY FLAG |
|---|---|---|
| 0x000000 | 0x0002 | 1(VALID) |
| 0x000001 | 0x0002 | 1(VALID) |
| 0x000002 | 0x0005 | 1(VALID) |
| 0x000003 | 0x0005 | 1(VALID) |
| 0x000004 | 0x0000 | 1(VALID) |
| 0x000005 | 0x0000 | 1(VALID) |
| ... | ... | ... |

| Host Group ID | ASSIGNED RESOURCE GROUP ID | VALIDITY FLAG |
|---|---|---|
| 0x000000 | 0x0002 | 1(VALID) |
| 0x010000 | 0x0002 | 1(VALID) |
| 0x020000 | 0x0002 | 1(VALID) |
| 0x030000 | 0x0002 | 1(VALID) |
| 0x040000 | 0x0005 | 1(VALID) |
| 0x040001 | 0x0005 | 1(VALID) |
| 0x040002 | 0x0005 | 1(VALID) |
| 0x040003 | 0x0005 | 1(VALID) |
| 0x050000 | 0x0000 | 1(VALID) |
| 0x060000 | 0x0000 | 1(VALID) |

| Port ID | ASSIGNED RESOURCE GROUP ID | VALIDITY FLAG |
|---|---|---|
| 0x000000 | 0x0002 | 1(VALID) |
| 0x000001 | 0x0002 | 1(VALID) |
| 0x000002 | 0x0002 | 1(VALID) |
| 0x000003 | 0x0002 | 1(VALID) |
| 0x000004 | 0x0005 | 1(VALID) |
| 0x000005 | 0x0000 | 1(VALID) |
| 0x000006 | 0x0000 | 1(VALID) |

FIG. 30

| LDEV ID | ASSIGNED RESOURCE GROUP ID | VALIDITY FLAG |
|---|---|---|
| 0x000000 | 0x0011 | 1(VALID) |
| 0x000001 | 0x0011 | 1(VALID) |
| 0x000002 | 0x0012 | 1(VALID) |
| 0x000003 | 0x0012 | 1(VALID) |
| 0x000004 | 0x0003 | 1(VALID) |
| 0x000005 | 0x0003 | 1(VALID) |
| 0x000006 | 0x0003 | 1(VALID) |
| 0x000007 | 0x0003 | 1(VALID) |

FIG.31

| Parity Group ID | ASSIGNED RESOURCE GROUP ID | VALIDITY FLAG |
|---|---|---|
| 0x00000000 | 0x0002 | 1(VALID) |
| 0x00000001 | 0x0002 | 1(VALID) |
| ... | ... | ... |

FIG. 32

| Host Group ID | ASSIGNED RESOURCE GROUP ID | VALIDITY FLAG |
|---|---|---|
| 0x00000000 | 0x0011 | 1(VALID) |
| ... | ... | ... |
| 0x00010000 | 0x0011 | 1(VALID) |
| 0x00020000 | 0x0012 | 1(VALID) |
| 0x00030000 | 0x0012 | 1(VALID) |
| ... | ... | ... |

FIG.33

| Port ID | ASSIGNED RESOURCE GROUP ID | VALIDITY FLAG |
|---|---|---|
| 0x00000000 | 0x0001 | 1(VALID) |
| 0x00000001 | 0x0001 | 1(VALID) |
| 0x00000002 | 0x0001 | 1(VALID) |
| 0x00000003 | 0x0001 | 1(VALID) |
| . . | . . | . . |

FIG. 34

| LDEV ID | ASSIGNED RESOURCE GROUP ID | VALIDITY FLAG |
|---|---|---|
| 0x000000 | 0x0011 | 1(VALID) |
| 0x000001 | 0x0011 | 1(VALID) |
| 0x000002 | 0x0012 | 1(VALID) |
| 0x000003 | 0x0012 | 1(VALID) |
| 0x000004 | 0x0011 | 1(VALID) |
| 0x000005 | 0x0011 | 1(VALID) |
| 0x000006 | 0x0012 | 1(VALID) |
| 0x000007 | 0x0012 | 1(VALID) |
| ... | ... | ... |

FIG.35

| Parity Group ID | ASSIGNED RESOURCE GROUP ID | VALIDITY FLAG |
|---|---|---|
| 0x00000000 | 0x0002 | 1(VALID) |
| 0x00000001 | 0x0002 | 1(VALID) |
| ... | ... | ... |

FIG. 36

| Host Group ID | ASSIGNED RESOURCE GROUP ID | VALIDITY FLAG |
|---|---|---|
| 0x000000 | 0x0011 | 1(VALID) |
| ... | ... | ... |
| 0x010000 | 0x0011 | 1(VALID) |
| 0x020000 | 0x0012 | 1(VALID) |
| 0x030000 | 0x0012 | 1(VALID) |
| ... | ... | ... |

FIG. 37

| Port ID | ASSIGNED RESOURCE GROUP ID | VALIDITY FLAG |
|---|---|---|
| 0x00000000 | 0x0001 | 1(VALID) |
| 0x00000001 | 0x0001 | 1(VALID) |
| 0x00000002 | 0x0001 | 1(VALID) |
| 0x00000003 | 0x0001 | 1(VALID) |
| ... | ... | ... |

FIG. 38

| USER GROUP ID | USER GROUP NAME | RESOURCE GROUP ID BITMAP |
|---|---|---|
| 0x0000 | UG0 | 1111 1111 1111 1111 1111 1111 . . . . . . . . . . |
| 0x0001 | UG1 | 0000 0100 0000 0000 0000 0000 . . . . . . . . . . |
| 0x0002 | UG2 | 0111 0000 0000 0000 0000 0000 . . . . . . . . . . |
| . . . | . . . | . . . |
| 0x0011 | UG11 | 0000 0000 0000 0000 0000 0100 . . . . . . . . . . |
| 0x0012 | UG12 | 0000 0000 0000 0000 0000 0010 . . . . . . . . . . |
| . . . | . . . | . . . |

FIG. 39

| LDEV ID | PROVISIONING TYPE | ATTRIBUTE |
|---|---|---|
| 0x000000 | DP VOL | NONE |
| 0x000001 | DP VOL | NONE |
| 0x000002 | DP VOL | NONE |
| 0x000003 | DP VOL | NONE |
| 0x000004 | Basic VOL | Pool VOL |
| 0x000005 | Basic VOL | Pool VOL |
| 0x000006 | Basic VOL | Pool VOL |
| 0x000007 | Basic VOL | Pool VOL |

FIG. 45

COMPUTER SYSTEM AND ITS CONTROL METHOD

TECHNICAL FIELD

The present invention relates to a computer system. Particularly, the invention relates to a computer system for partitioning resources for a storage system and allocating storage resource groups to a plurality of users, and a method for controlling such a computer system.

BACKGROUND ART

In the environment where data of a plurality of users such as a plurality of companies coexist in a storage system, there is an increasing need to operate and manage the storage system for each user, that is, the need for multi-tenancy. This multi-tenancy environment achieves efficient operation of storage resources and facilitation of the management thereof.

The multi-tenancy environment requires a mechanism for security so that, for example, a storage system administrator of each company will not destroy data (volumes) of other companies, data will not be leaked to other companies, and no influence will be exerted on the operation by storage administrators of other companies.

There is a known system for realizing a plurality of storage resource groups by logically partitioning storage resources in order to realize the above-described multi-tenancy environment. This system can realize the above-described multi-tenancy environment by allocating the logically-partitioned storage resource groups to individual companies. Incidentally, the storage resource(s) will be hereinafter abbreviated as the resource(s), and the storage resource group(s) will be hereinafter abbreviated as the resource group(s) (RSG(s)).

A resource group forming function requires a cache partitioning function and a resource partitioning function. The cache partitioning function logically partitions a cache in the storage system. The partitioned virtual caches are called [CLPR]. The resource partitioning function logically partitions resources (such as ports, CLPRs, parity groups, and LDEVs) in the storage system. The partitioned resources are called [SLPR].

A system for realizing conventional resource groups creates a resource group based on a CLPR number and an SLPR number. As an administrator of the storage system allocates each resource group to a host computer, a system for ensuring security between host computers can be realized without having I/O processing of a certain host computer affect other host computers.

By means of the above-described resource partitioning function, the administrator of the entire storage system (overall administrator) can set administrators (partitioned administrators for the resource groups which are partitioned for different purposes and for different uses. As a conventional technique related to the resource partitioning function, there is, for example, a technique disclosed in Japanese Patent Application Laid-Open (Kokai) Publication No. 2006-185386.

CITATION LIST

Patent Literature

PTL 1: Japanese Patent Application Laid-Open (Kokai) Publication No. 2006-185386

SUMMARY OF INVENTION

Technical Problem

In a form where a plurality of management users are provided in one company and a plurality of users are made to manage the resources belonging to the company, if the authorities of an overall management user, the authorities of partitioned management users, and allocation of resources groups to the plurality of users are not properly operated, there are problems of an imbalance in the allocation of the resources between a plurality of users and the inability to ensure information security between the plurality of users.

So, it is an object of the present invention to provide a computer system and its control method capable of allocating resources between a plurality of users in a balanced manner and ensuring information security between the plurality of users even when the plurality of users are made to extensively manage a storage system.

Solution to Problem

In order to achieve the above-described object, a computer system according to the present invention includes: a storage system for controlling read access or write access from a host computer to a storage device; and a management device for managing a plurality of resources for the storage system and a plurality of users sharing the storage system; wherein the storage system includes: a plurality of resource groups defined by grouping of the plurality of resources; a storage area for storing management information of the plurality of resource groups and association information between the plurality of resources and the plurality of resource groups; and a plurality of user groups (hereinafter abbreviated as UG) defined by grouping of the plurality of users, each of the user groups being allocated to at least one of the plurality of resource groups; and wherein based on login of at least one user from among the plurality of users, the management device has the storage system execute operation permitted by an authority granted to the user group, to which the relevant user belongs, on the resource group allocated to the user group.

Therefore, the present invention is designed so that the range of executable operations for the management user is decided based on the authority granted to a user group, to which the user belongs, and a resource group allocated to the user group. So, it is possible to allocate the resources between the plurality of users in a balanced manner and ensure information security between the users.

Advantageous Effects of Invention

According to the present invention, it is possible to provide computer system and its control method capable of allocating resources to a plurality of users in a balanced manner and ensuring information security between the users even when the plurality of users are made to extensively manage a storage system.

BRIEF DESCRIPTION OF DRAWINGS

FIG. 5A is a management table showing the correspondence relationship between logical volume (LDEV) IDs and their assigned resource group IDs and is an example of the management table before a resource group is set to the storage system.

FIG. 5B is an example of the management table of logical volumes after the resource group is set to the storage system.

FIG. 6A is an example of a management table of parity groups before a resource group is set to the storage system.

FIG. 6B is an example of the management table of parity groups after the resource group is set to the storage system.

FIG. 7A is an example of a management table of host groups before a resource group is set to the storage system.

FIG. 7B is an example of the management table of host groups after the resource group is set to the storage system.

FIG. 8A is an example of a management table of ports before a resource group is set to the storage system.

FIG. 8B is an example of the management table of ports after the resource group is set to the storage system.

FIG. 9 is an example of a table for managing resource group IDs.

FIG. 12 is a user group ID bitmap table for managing identification of user groups, to which the users belong, by using bitmaps.

FIG. 13 is an authority bitmap table for managing authorities of the user groups by using bitmaps.

FIG. 15 is a table in which operations that can be executed by management users with respect to the storage system are associated with each authority.

FIG. 16 is a resource group ID bitmap table for managing resource groups allocated to the user groups by using bitmaps.

FIG. 17 is an example of a session management table for managing user login sessions.

FIG. 19 is an example of an LDEV configuration information table after the storage system is partitioned into a plurality of virtual systems.

FIG. 20 is an example of a parity group configuration information table after the storage system is partitioned into a plurality of virtual systems.

FIG. 21 is an example of a host group configuration information table after the storage system is partitioned into a plurality of virtual systems.

FIG. 22 is an example of a port configuration information table after the storage system is partitioned into a plurality of virtual systems.

FIG. 30 is a management table showing an example of LDEV configuration information in the form where the plurality of resource groups are formed in the in-house virtual private storage system (FIG. 23).

FIG. 31 is a management table showing an example of parity group configuration information in the form where the plurality of resource groups are formed in the in-house virtual private storage system (FIG. 23).

FIG. 32 is a management table showing an example of host group configuration information in the form where the plurality of resource groups are formed in the in-house virtual private storage system (FIG. 23).

FIG. 33 is a management table showing an example of port configuration information in the form where the plurality of resource groups are formed in the in-house virtual private storage system (FIG. 23).

FIG. 34 is a management table showing an example of LDEV configuration information in the form where the plurality of resource groups are formed in the in-house virtual private storage system (FIG. 28).

FIG. 35 is a management table showing an example of parity group configuration information in the form where the plurality of resource groups are formed in the in-house virtual private storage system (FIG. 28).

FIG. 36 is a management table showing an example of host group configuration information in the form where the plurality of resource groups are formed in the in-house virtual private storage system (FIG. 28).

FIG. 37 is a management table showing an example of port configuration information in the form where the plurality of resource groups are formed in the in-house virtual private storage system (FIG. 28).

FIG. 38 is a bitmap table for bitmap management of the correspondence relationship between the user groups and the resource groups in the form where the plurality of resource groups are formed in the in-house virtual private storage system (FIG. 28).

FIG. 39 is an example of a management table for specifying the relationship between LDEVs and provisioning types.

FIG. 45 is a GUI screen displayed by the external management terminal in step 1820 of FIG. 18.

DESCRIPTION OF EMBODIMENTS

Figure 1:
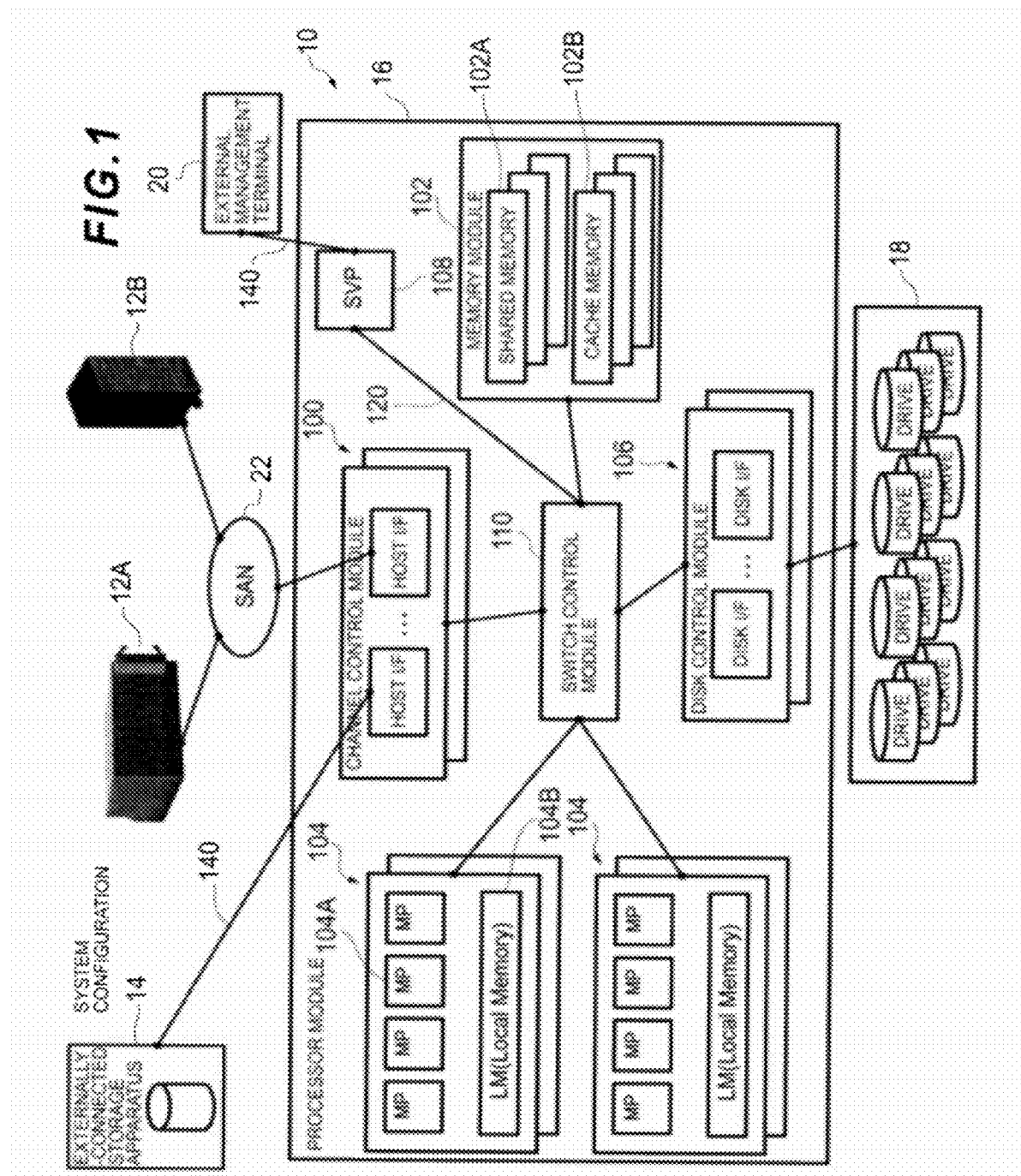
FIG. 1 is a hardware block diagram of a computer system according to an embodiment.

An embodiment of the present invention will be explained with reference to each of the attached drawings. FIG. 1 shows overall hardware of a computer system according to this embodiment. The computer system includes a storage system 10 and a plurality of host computers 12 (12A, 12B). The storage system 10 includes a storage controller 16 and a storage driving device 18. An external connection storage apparatus 14 may be connected to the storage system 10. The storage controller 16 and the storage driving device 18 may be contained in the same chassis or may be placed in separate chassis and connected via a network.

Examples of the storage driving device 18 include hard disk drives, solid state drives, and optical disk drives. The storage controller 16 executes data read/write processing on the storage driving device 18 in accordance with commands received from the host computer 12 and executes various processing for, for example, setting and changing configuration information of the storage system when receiving commands from the host computer 12.

The host computer 12 is a computer device equipped with, for example, a CPU and a memory. The host computer 12 is a host system such as a server, a workstation, or a mainframe computer and is used for a large-scale data management system such as an automated teller machine of banks or an airplane seat reservation system. Different users operate the storage system by using each host computer 12. The user means, for example, a company or each division of a company.

The host computer device 12 is connective via, for example a SAN 22, to the storage system 10. The SAN 22 is a network for sending data to, and receiving data from, the host computer 12 in blocks which are data management units for storage resources provided by the storage driving device 18. An example of a communication protocol between the host computers 12 and the storage system 10 via the SAN 22 is Fibre Channel protocol. The host computer 12 and the storage system 10 may be connected via, for example, a LAN or directly without the intermediary of any network. A LAN 140 is used as an intermediary to connect the external storage apparatus 14 and the storage system 10 and to connect the external management terminal 20 and the SVP 108, respectively.

A plurality of hard disk drives 18 as the storage driving device constitute a plurality of parity groups (also called RAID groups) and a logical storage area of each parity group is partitioned to constitute logical volumes (LDEVs).

The storage controller 16 includes a channel control module 100, a memory module 102, a processor module 104, and a disk control module 106 and is further connected to a management terminal called an SVP (Service Processor) 108. Furthermore, the storage controller 16 includes a switch control module 110 for mutually connecting devices such as the channel control module 100 via an internal LAN and receiving and delivering data and commands. The switch control module 110 is composed of, for example, a crossbar switch.

The channel control module 100 is connected via the SAN 22 to the host computer 12. Ports of the channel control module 100 for connecting to the SAN 22 are a target port whose attribute is to receive commands, and an external port or initiator port whose attribute is to issue commands. The channel control module 100 includes communication interfaces (host I/Fs) to communicate with the host computers 12 and has a function sending, for example, data and commands to, and receiving them from, the host computer 12.

The processor module 104 executes processing on host I/O such as reading data from, and writing data to, logical volumes. The processor module 104 includes a plurality of microprocessors (MPs) 104A and a local memory (LM) 104B for recording microprograms and control data for the MPs.

The disk control module 106 has communication interfaces (disk I/Fs) with a plurality of hard disk drives (HDD) 18 for storing data and executes input/output of commands and data to/from the HDDs 18. Incidentally, the channel control module 100, the processor module 104, and the disk control module 106 are formed into chips and a plurality of chips of each module are mounted in the storage controller 16 from the viewpoint of redundancy.

The memory module 102 includes a plurality of shared memory modules 102A and a plurality of cache memory modules 102B. Both the shared memory modules 102A and the cache memory modules 102B are shared by the channel control module 100, the processor module 104, and the disk control module 106. The shared memory modules 102A are used to store, for example, control information and commands and the cache memory modules 102B are used to temporarily store data.

The SVP 108 is a control means for maintaining and managing the storage system 10 and is connected to the external management terminal 20 via the LAN 140. An overall management user manages the resources of the entire storage system 10 by accessing a storage management program for the SVP 108 via a GUI of the external management terminal 20. A partitioned management user also accesses the resources, which are targets to be managed, by accessing the GUI of the external management terminal 20 via its own client computer. The user may manage the resources by an in-band method of accessing the storage system via a management server as a host computer instead of an out-of-band method via the SVP 108. Incidentally, the reference numeral 120 is an internal LAN for connecting the SVP 108 and the switch control module.

The resources include physical resources and logical resources. Furthermore, the resources include storage resources for data storage and resources for control. Examples of the resources are as follows. Examples of the physical resources include ports of the channel control module 100, parity groups constituted from a plurality of HDDs, the cache memories (CLPR), and ownership of the microprocessors. Examples of the logical resources include attributes of the ports, host groups belonging to the ports, and logical volumes. Management of the resources means to perform various operations on the resources such as to partition resources and set resource groups in accordance with the authority over the user resources, set or change the attributes of the resources, create a new resource, allocate the resource, and change the allocation of the resource.

The overall management user is granted the authority to manage the overall resources of the storage system. The partitioned management user is granted the authority to be capable of managing the resources within the range of a resource group(s) allocated to themselves. A plurality of user groups are set to the aforementioned storage system 10 so that a plurality of users can manage the resource groups. For example, a company has an overall management user group(s) and user groups for management of each division of the company. Not only a resource group is set to each user group, but also the authority over the resource group is granted to each user group. The content of processing that can be executed by the user group on the resource is decided according to characteristics of the relevant resource such as the content of the authority of the user group, and the type, range, capacity, and quantity of the allocated resource group(s). For example, physical resource groups and logical resource groups are allocated to a user group, while only logical resource groups are allocated to another user group. A user who is expected to be in charge of management for the system maintenance is assigned the authority to enable extensive operations to carry out the system maintenance, as well as physical resource groups and logical resource groups. On the other hand, a user who is expected to take charge of management for the system operation and utilization is assigned the authority enough to carry out the system utilization and operation, as well as logical resource groups.

Figure 2:
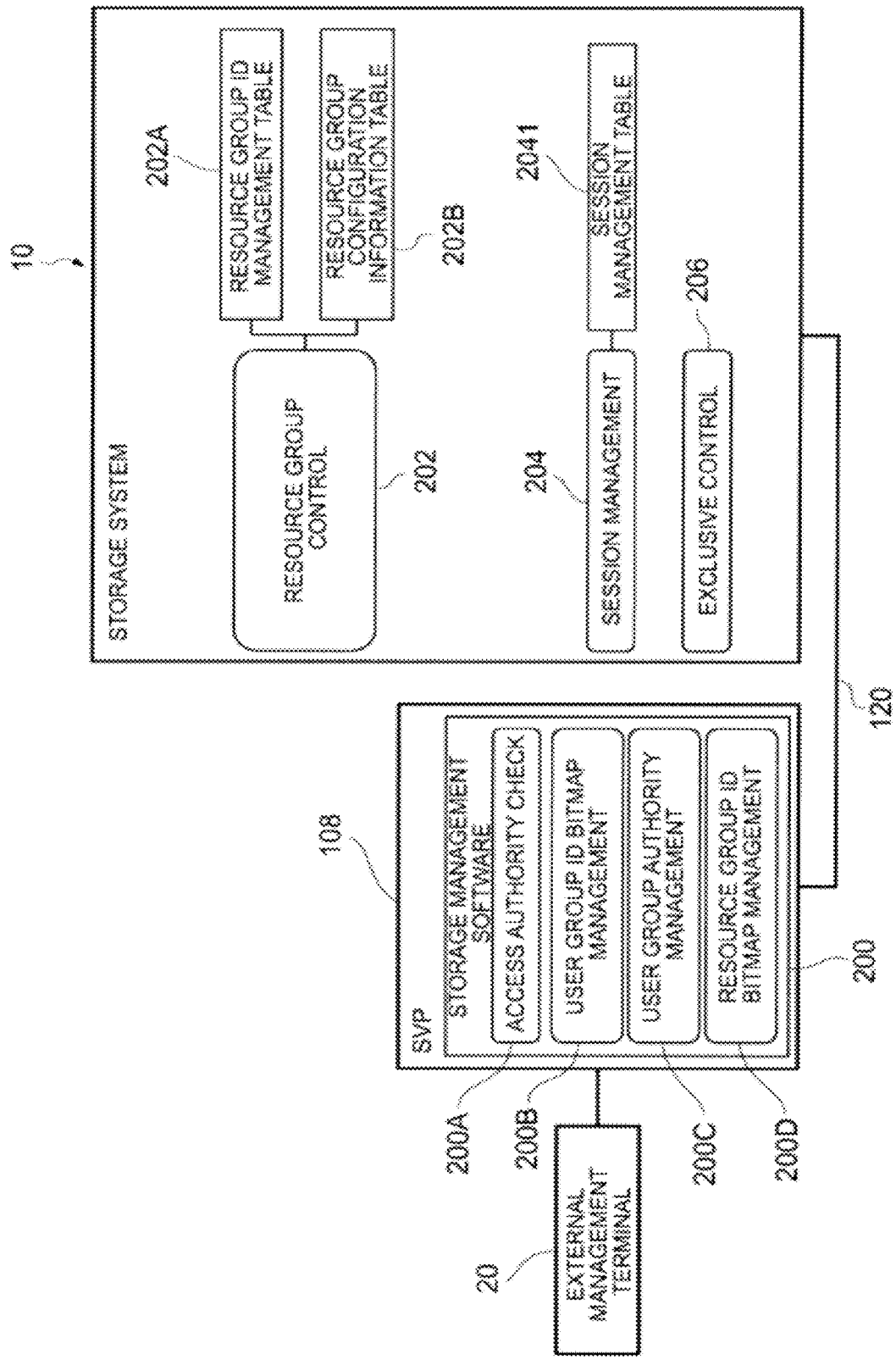
FIG. 2 is an example of a functional block diagram for implementing a user group and resource group management function of the computer system.

FIG. 2 is an example of a functional block diagram for implementing a user group and resource group management function of the computer system. The SVP 108 is equipped with storage management software 200 and a GUI for input to, and output from, the storage management software operates on the external management terminal 20. The storage management software 200 performs a user access authority check 200A, user group bitmap management 200B, user group authority management 200C, and resource group ID bitmap management 200D. Furthermore, the microprogram of the processor module for the storage system 10 realizes resource group control 202. A resource group ID management table 202A and a resource group configuration information table 202B are applied to the resource group control 202. Furthermore, the storage system 10 performs user login session management. A session management table 2041 is applied to the session management 204. Then, the storage system 10 performs exclusive control 206 of sessions.

The computer system is characterized in that it partitions the resources of the storage system 10 into a plurality of virtual systems and further allocates the resources of the virtual systems to a plurality of user groups, and delegates resource groups to the authority of the user groups. This sequence of steps will be explained with reference to the relevant drawings.

Figure 3:
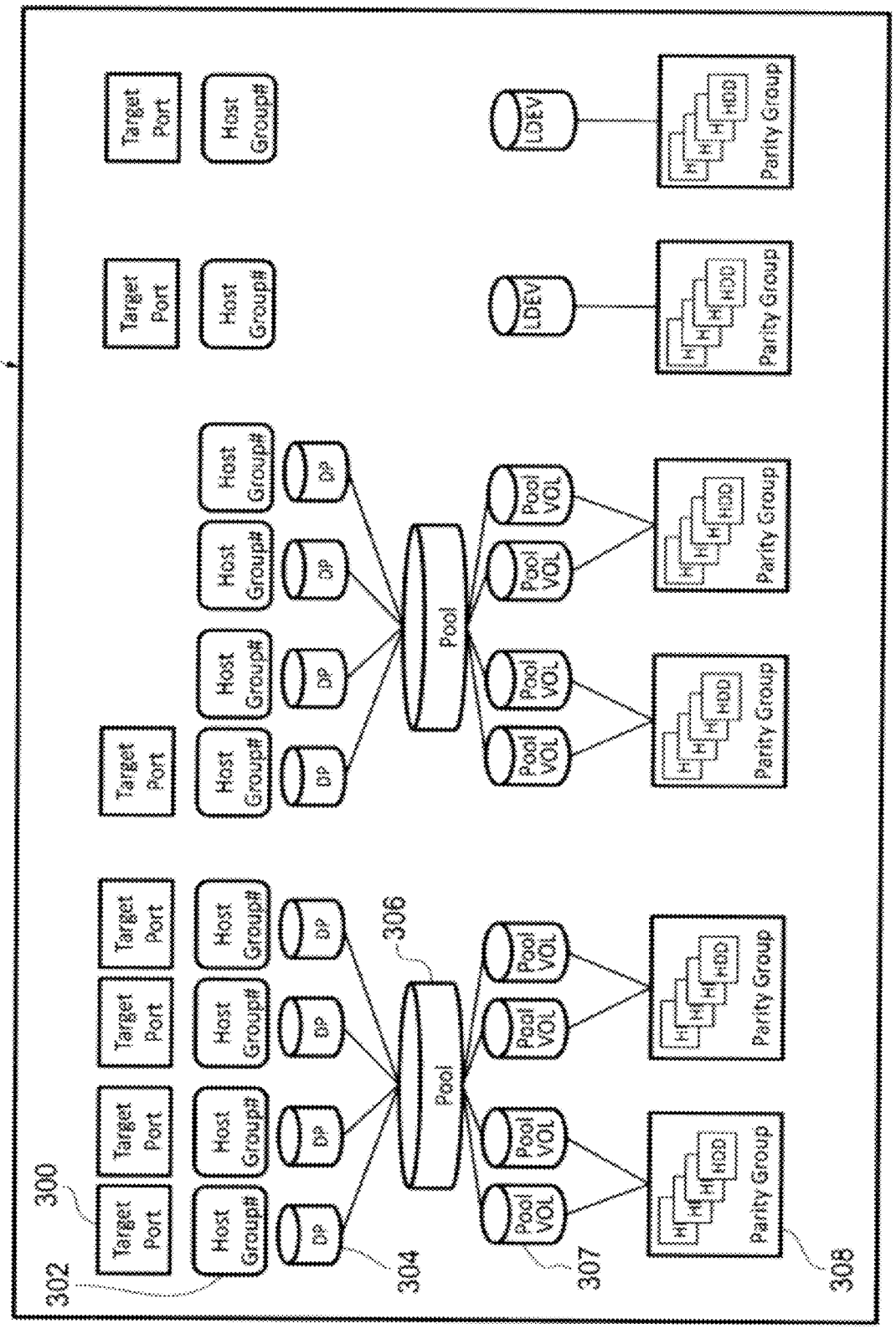
FIG. 3 is a block configuration diagram of a storage system before a resource group(s) is set.

FIG. 3 shows a block configuration of the storage system before a resource group (RSG) is set. Since all users can operate all RSGs in this state, it is impossible to ensure sufficient security and performance. The storage system is equipped with dynamic provisioning. Specifically speaking, logical volumes (LDEV: pool volumes) 307 are allocated from parity groups 308 to pools 306 and a storage area is allocated from the pools 306 to capacity-virtualized logical volumes (LDEV: DP volumes) 304 in accordance with write access from the host computer 12. The storage system 10 has physical ports 300, from which paths to the host computers 12 are formed, and the ports are associated with host groups 302. If a plurality of servers refer to one logical module, the plurality of servers are defined as a group, which is a host group. Examples of the physical resources include the ports 300 and the parity groups 308. On the other hand, examples of the logical resources include the pool volumes 307, the pools 306, the DP volumes 302, and the host groups 304.

Figure 4:
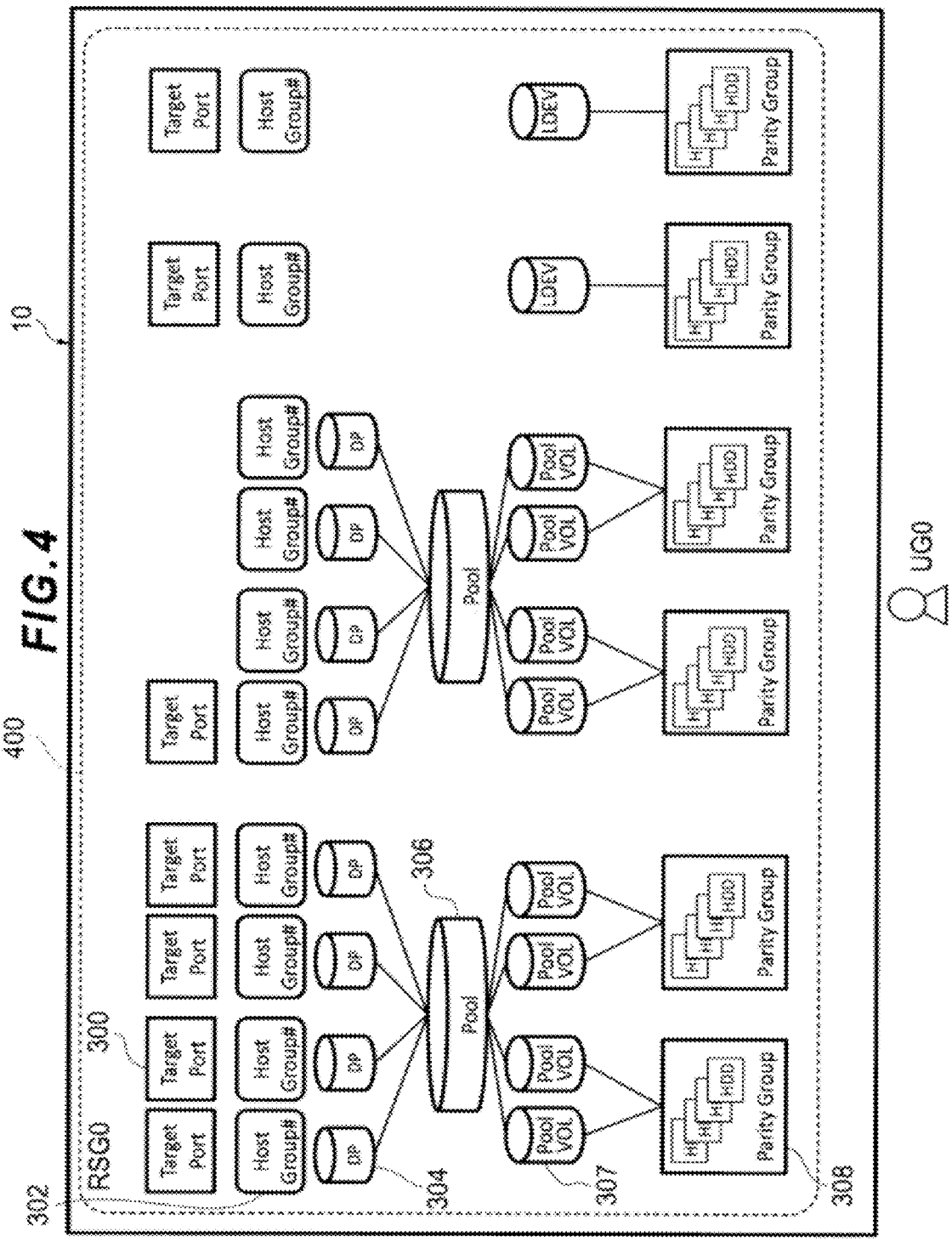
FIG. 4 is a block configuration diagram of the storage system in a state where one resource group is set to the storage system.

If the overall management user validates RSG settings in the storage system by accessing the management terminal, all resources 400 are made to temporarily belong to a resource group (resource group name: RSG0) with a specific resource group ID (ID=0x0000) as shown in FIG. 4. The correspondence relationship between each resource and the resource group will be explained later with respect to a configuration information table. Referring to FIG. 4, UG0 represents a user group to which the overall management user belongs and UG0 is granted the overall management authority over the storage system.

In the state where all the resources of the storage system 10 belong to the same resource group (RSG0), a plurality of users can refer to all the resources and it is impossible to ensure security. So, from the viewpoint of ensuring security and implementing the operation of the storage system in an suitable manner, the computer system 10 is designed so that grouping of the resources of the storage system into a plurality of RSGs is performed by a user belonging to the overall management user group (UG0) having a specific authority (system authority). Incidentally, the partitioned management user has a plurality of authorities, which will be explained later. The authorities are granted to not the user(s) themselves, but to the user group(s) (hereinafter sometimes abbreviated as UG(s)) as described above and the authorities of the user(s) are decided depending on which UG the relevant user belongs to.

Next, the configuration information table (FIG. 2: 202B) of each resource group (RSG) will be explained. In this explanation, changes in the table before and after setting an RSG to the storage system 10 will be explained. FIG. 5A shows the correspondence relationship between a logical volume (LDEV) ID and an assigned resource group ID and is a table before the resource group (RSG0) is set to the storage system. FIG. 5B is a table after the resource group (RSG0) is set to the storage system. A validity flag is used to manage the RSG setting status; and if an RSG is set, the validity flag changes from [0 (invalid)] to [1 (valid)]. Since all the resources are set to RSG0 as described above, all the validity flags are set to [1]. When the validity flags in the table are changed, all the resources (LDEV) are made to belong to RSG0 (ID=0x0000). This resource group configuration information table is stored in the shared memory 102A for the storage system 10. The LDEVs include pool volumes and virtual volumes as described earlier.

FIG. 6A and FIG. 6B are tables about parity groups, FIG. 7A and FIG. 7B are tables about host groups, and FIG. 8A and FIG. 8B are tables about port groups). The difference between [A] and [B] is the same as the difference between FIG. 5A and FIG. 5B. The correspondence relationship between the resource group ID and each resource, and the change of the validity flag are also the same as those in FIG. 5A and FIG. 5B.

Together with the above-mentioned resource group configuration information tables (FIGS. 5A and 5B), the resource group ID management table 202A in FIG. 9 is stored in the shared memory 102A for the storage system. The resource group ID management table 202A is used to associate a resource group ID with a resource group name. Furthermore, a [locked login session ID] in the resource group ID management table 202A is intended to prevent an RSG (resource group), which is being operated by a user, from being operated by another user. The [session ID] is assigned to login of a user and is set when locking it against login by another user. FIG. 9 shows that a user connects to RSG1 to RSG3, RSG11, and RSG12 with a [session ID=0101] and is operating these resource groups. The configuration of RSGs other than RSG0 will be described later.

Figure 10:
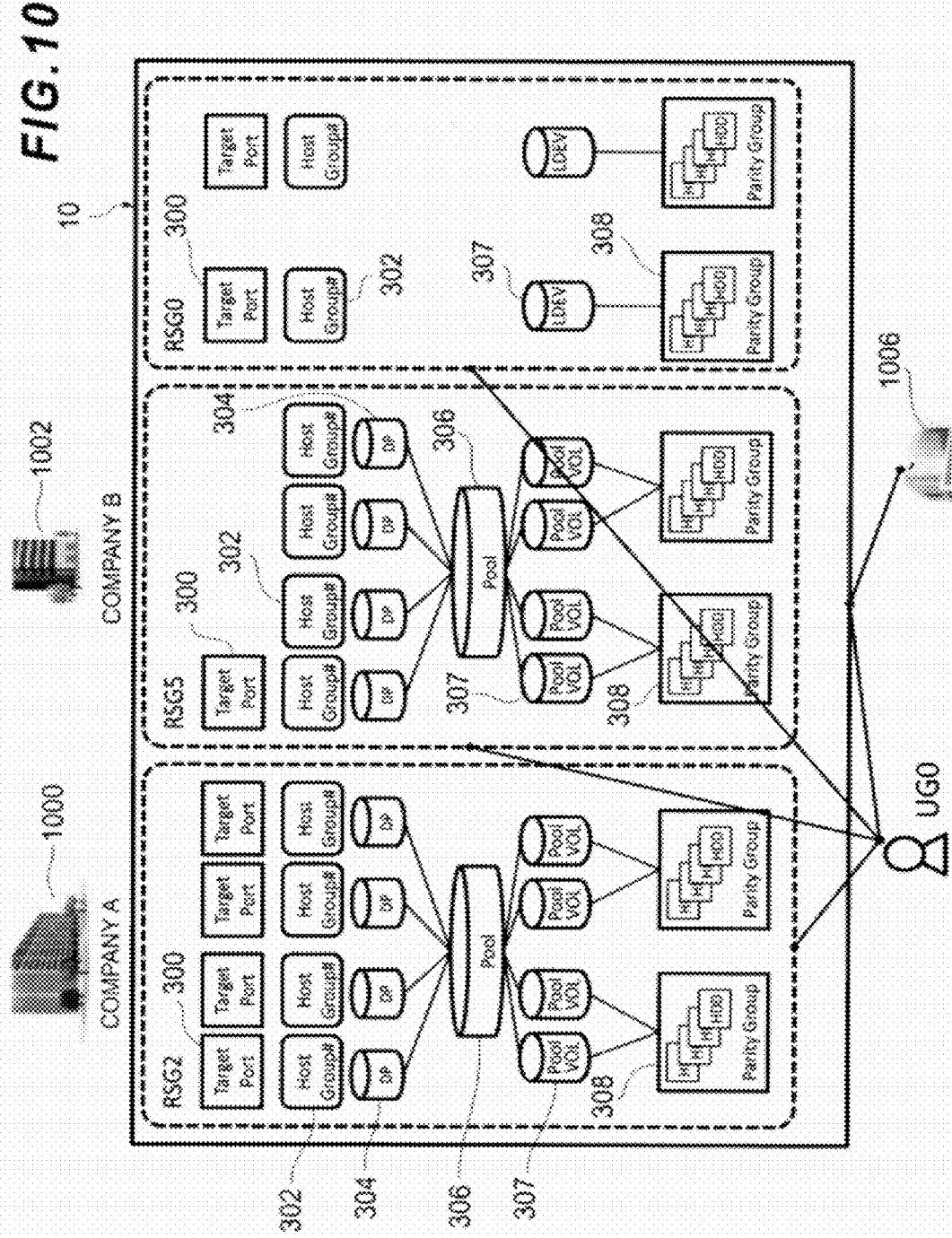
FIG. 10 is a block diagram of the storage system in a state where the resources for the storage system are partitioned and grouped into a plurality of virtual private storage systems.

After the resources of the storage system are set to RSG0, the overall management user partitions the storage system into a plurality of virtual storage systems as shown in FIG. 10. For example, a management user (who belongs to UG0) of a data center 1006 manages the storage system 10, partitions the storage system 10 into a plurality of virtual (private) storage systems, and allocates them to different companies. For example, RSG2 is allocated to company A (1000) and similarly RSG5 is allocated to company B (1002).

As UG0 is assigned the authority (security authority) to be capable of managing all the resources of the storage system 10, the management user belonging to UG0 can cut out RSG2 and RSG5 from RSG0 of the storage system and define a plurality of virtual (private) storage systems in the storage system 10 for each company as shown in FIG. 10. The virtual storage system composed of RSG2 is for company A and the virtual storage system composed of RSG5 is for company B. RSG2, RSG5, and RSG0 are allocated to UG0 in order to realize the management of RSG2 and others. Incidentally, the logical resources such as the host groups 302, the virtual volumes 304, and the pools 306 may be defined and set by users who use the virtual systems (a user of company A or a user of company B).

Under the above-described circumstance, the [assigned resource group ID (ID of a resource group to which the relevant resource belongs)] corresponding to the resource ID in the resource configuration information tables (FIGS. 5A, 5B to FIGS. 8A, 8B) is changed along with a change from the state in FIG. 4 to the state in FIG. 10. Specifically speaking, when the management user UG0 changes the resource group configuration information table 202B for the shared memory 102 via the external management terminal 20 and the SVP 108, the storage system 10 changes the configuration of the resource groups in accordance with the change of the tables. The resources remaining after cutting out RSG2 and RSG5 from RSG0 remain in RSG0. Incidentally, a state of RSG0 with no resource is permissible as one management state. A physical resource added to the storage system is made to temporarily belong to RSG0 and will then be moved or distributed from RSG0 to an RSG of each virtual storage system under the authority of UG0.

Figure 11:
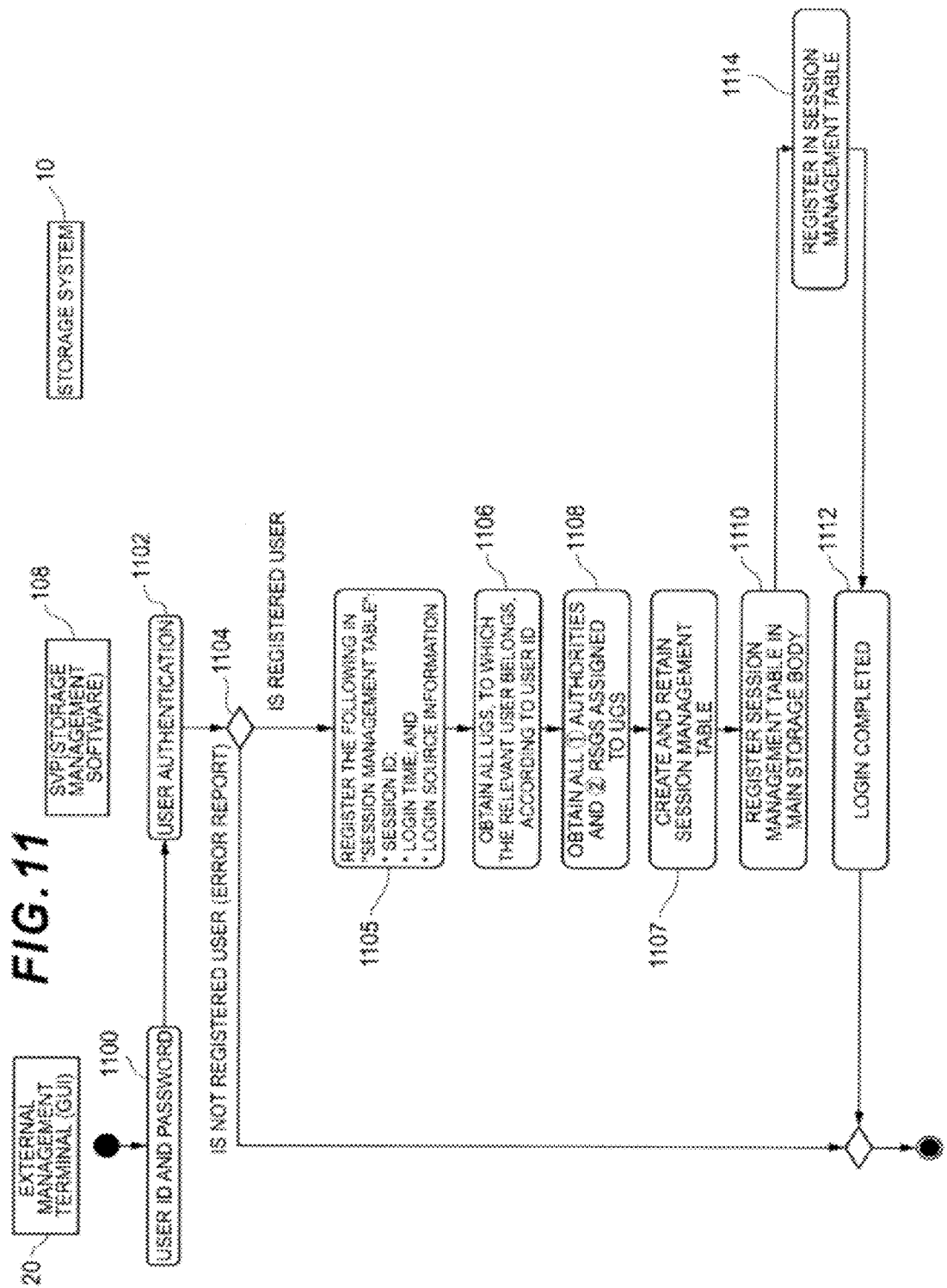
FIG. 11 is a flowchart of an example of processing for logging into an external management terminal of a user.

The above-described processing sequence for partitioning the storage system into the virtual storage systems is implemented by cooperation between the storage management software 200 for the SVP 108 and the microprogram for the storage system 10. FIG. 11 is a flowchart for processing user login.

After the overall management user inputs a user ID and a password to the GUI of the external management terminal 20 (1100), the input information is sent to the storage management software 200 for the SVP 108 and the SVP performs user authentication (1102). If it is determined as a result of the user authentication judgment (1104) that the login user is not a registered user, the SVP sends an error report to the GUI of the external management terminal. If it is determined as a result of this judgment that the login user is a registered user, the SVP sets a session ID to the login and registers login time and login source information in a session management table (1105). The session management table will be explained later. The login source information includes, for example, the user ID, password, and IP address.

Next, the SVP obtains necessary information to judge what type of authority on which RSG the login user has. The SVP firstly obtains, as necessary information, all UGs to which the relevant user belongs, based on the user ID of the login user by referring to a user group ID bitmap table 1200 in FIG. 12 (1106). The user group ID bitmap table 1200 is created by the overall management user for the purpose of the user group ID bitmap management 200B (FIG. 2) at the time of user registration and is registered in a memory area in the SVP 108. The user group ID bitmap table manages the user groups, to which the relevant user belongs, for each user by using bitmaps and each bit of the bitmaps corresponds to an individual user group. A user is specified by its user ID and user name.

For example, regarding a user whose user name is [User2], a bit at the third position in the user group ID bitmap is [1], which indicates that it belongs to UG2 (the user group ID=0x02). If one user belongs to a plurality of UGs, [1] is set to bits at a plurality of positions corresponding to a plurality of user group IDs. For example, according to the bit positions to which [1] is set, User20 belongs to three user groups (user group IDs=0x0a, 0x0b, 0x10).

Next, after deciding the user group(s) of the login user, the SVP obtains authority information and resource group information allocated to that user group (1108). The SVP refers to an authority bitmap table 1300 in FIG. 13 in order to obtain the authority information. The authority bitmap table 1300 is used to execute the user group authority management 200C (FIG. 1) and the authority is set to each user group and registered in a bitmap form. The authority bitmap table 1300 is recorded in the memory for the SVP 108.

When defining a user group (UG), the overall management user registers an authority bitmap in the authority bitmap table 1300. The authority/authorities corresponding to a bit (s), to which [1] is set, in the bitmap is set to the user group. If the user belongs to a plurality of user groups, the authorities obtained by OR operation of the authority bits assigned to each user group are granted to the user.

Figure 14:
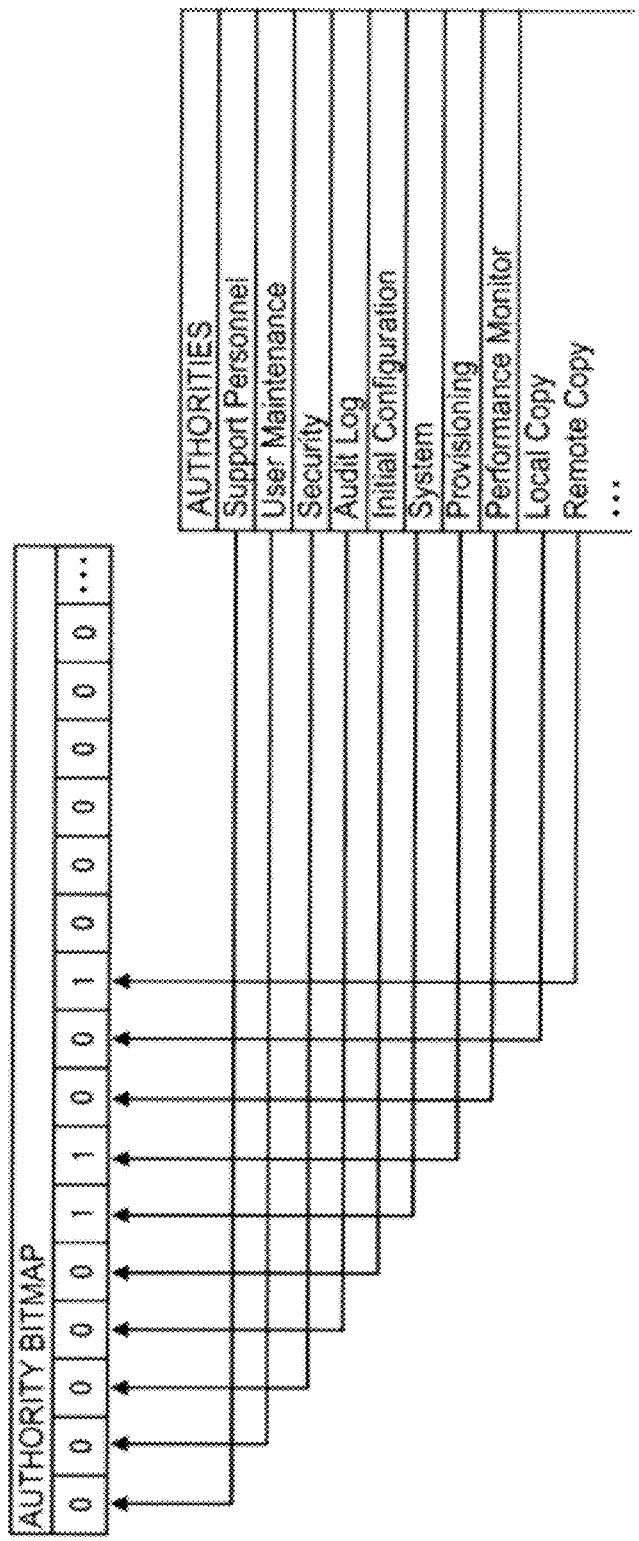
FIG. 14 is a table showing an example of the correspondence relationship between an authority bitmap and authorities.

Also, the correspondence relationship between all the authorities relating to the storage system and each bit in the authority bitmap is as shown in FIG. 14. Furthermore, the content of operations which can be performed by the overall or partial management user with respect to the storage system under each authority is as shown in FIG. 15. For example, a user whose user name is (User0) belongs to the user group (UG0) according to FIG. 12. Then, regarding the authority corresponding to this user group, the third bit in its authority bitmap is set on according to the authority bitmap table (FIG. 13), so the [security] authority is granted to the user, whose user name is [User0], according to FIG. 14. The correspondence relationship between the bitmap in the authority bitmap and the authority information, as well as control information relating to the correspondence relationship the authority information and the operation content permitted for the authority are set to the memory for the SVP 108 by the overall management user (UG0) in advance. In a case of in-band processing, the SVP is accessed from the server via the storage apparatus at the time of login from the in-band and resource group information and authority information relating to the login user are obtained and temporarily retained in the software operating on the server. Whether the configuration can be changed or not is judged based on such information.

Reference is made to a resource group ID bitmap table 1600 in FIG. 16 in order to obtain information about RSGs allocated to the user groups (UG). This resource group ID bitmap table 1600 is used to manage allocation of the resource group(s) to each user group for the purpose of the resource group ID bitmap management 200D (FIG. 2). If a user belongs to a plurality of user groups, resource groups corresponding to a bit string obtained by OR operation of bits in the resource group ID bitmap allocated to each user group are resource groups regarding which access by the login user is permitted. For example, if the login user belongs to a plurality of user groups (UG11, UG12), resource groups (RSGs) allocated to each user group are specified by [0001 0000 0000 0000 0100 . . . ] and [0001 0000 0000 0000 0010 . . . ] as shown in FIG. 16, so that the login user can access RSGs corresponding to a bit string [0001 0000 0000 0000 0110 . . . ] obtained by OR operation of the above bitmaps, that is, three RSGs (RSG ID=0x03, 0x11, 0x12) and operate these RSGs. The resource group ID bitmap table 1600 is also set by the overall management user to the memory for the SVP 108 at the time of user registration.

After completing the acquisition of the authority information (authority bitmap) and the RSG information (resource group ID bitmap) allocated to the login user, the SVP 108 updates and registers such information, together with the session ID generated at the time of the user login, in a session management table 1700 (FIG. 17) for the purpose of the session management 204 (FIG. 11: 1107, 1110). For example, a session whose session ID is (0101) is based on login of User0. The resource group ID bitmap and the authority bitmap, which are allocated to the login user to whom the relevant session ID is set, are registered for each session ID in the session management table 1700. The SVP 108 sends the session management table 1700 to the storage system 10 and the storage system 10 updates and registers the session management table in the shared memory 102A. After receiving completion notice from the processor 104 for the storage system, the SVP 108 completes the login (1112). The SVP 108 registers the authority of the relevant user and the information about the RSG(s) which is a management target(s), together with the session ID generated at the time of the user login, in the session management table 1700 and notifies the storage system of such registration, thereby enabling the storage system to check various resources for the login user, whether it is possible to operate those resources, and the authority.

An integrated management user who manages all resources of the storage system even after the resources of the storage system are partitioned into a plurality of virtual storage systems is required. So, the SVP makes UG0, who has the security authority even after setting the plurality of virtual storage systems continue to have the access authority over all the resources. The SVP keeps the bits [1] for the existing resource groups; and even when a new resource group is set or added to the storage system, the SVP automatically sets [1] to the new resource group. As a result, the integrated management user does not have to add every new RSG to UG0 every time an RSG is created or set. The ability of UG0 to access all the resource groups can be explained by the fact that all bits in the resource group ID bitmap for UG0 are [1] in FIG. 16.

Next, after the resource groups are validated in the storage system 10, the overall management user logically partitions the storage system into a plurality of systems for different companies as shown in FIG. 10 described earlier. This processing will be explained with reference to a flowchart in FIG. 18. When User0 (UG0) succeeds in login to the storage management software, the session management table is registered in the SVP 108 (FIG. 17). In response to a request from the external management terminal 20, the SVP 108 obtains the authority bitmap and the resource group ID bitmap of the login user from the session management table and sends them to the external management terminal 20 (1806).

The external management terminal 20 judges whether or not the login user has the security authority which is the authority for overall management. Since the login user (User0) has the security authority and has the right to access all the resources of the storage system, the external management terminal 20 requests lists of user groups and storage groups existing in the storage system from the SVP 108 (1808). After receiving this request, the SVP refers to the user group ID bitmap table 1200 (FIG. 12) and the resource group ID bitmap table 1600 (FIG. 16) and sends a user group list, to which bits are set, and a resource group list, to which bits are set, to the external management terminal 20 (1810). The user group list includes information about the correspondence relationship the user ID, the user name, and the user group ID and is or corresponds to a user group ID bitmap. The resource group list includes information about the correspondence relationship each resource ID and the resource group ID of a resource group, to which the relevant resource belongs, and is or corresponds to a configuration information table showing the relationship between the aforementioned resource ID and the resource group ID. If the login user has the authority other than the security authority, processing in and after step 1808 will not be executed and the operation other than the security authority will be performed.

The GUI of the external management terminal displays the user group list information and the resource group list information. The login user inputs the setting of a new resource group(s) ID to the related resource ID with respect to the list information in order to realize the form of target virtual storage systems, that is, virtual storage systems for company A and company B respectively as shown in FIG. 10 (1812). After finishing inputting the data, the external management terminal 20 sends the input data to the SVP 108. The SVP which has received the input data judges whether the resource group(s), which have been set or updated in order to configure the virtual storage system, is appropriate or not. In other words, the SVP judges whether or not the minimum resources required to configure the virtual storage system exist with respect to these resource groups. The minimum resources are physical resources, for example, parity groups and target ports. If these resources do not exist in the resource group, a data storage system for the host computer cannot be realized.

The above-mentioned judgment includes, for example, judgment (1) and judgment (2) described below. If an affirmative judgment is returned for either judgment (1) or judgment (2) with respect to the resource group allocated to the virtual storage system, it is determined that the resource group is appropriate.

Judgment (1): the resource group should include at least one of each of resources which are target ports, host groups, LDEVs, and parity groups. This judgment (1) is the basis assuming a case where the virtual storage system is already operated.

Judgment (2): the resource group should include at least one of each of resources which are target ports and parity groups. This judgment (2) is the basis assuming a case before the operation of the virtual storage system. Incidentally, in the case shown in FIG. 10, both RSG2 and RSG5 have the physical resources, so it is determined that [RSG(s) is appropriate].

If the SVP 108 determines that the RSG(s) is not appropriate, it sends an error message to the GUI of the external management terminal 20. The GUI provides an error display and prompts the login user to input data again. The error display includes, for example, displaying the type(s) of resources lacking in the resource group. The GUI may identify and display resources, which have not been set to the resource group, or resources which are recommended to be set to the resource group.

Figure 45:
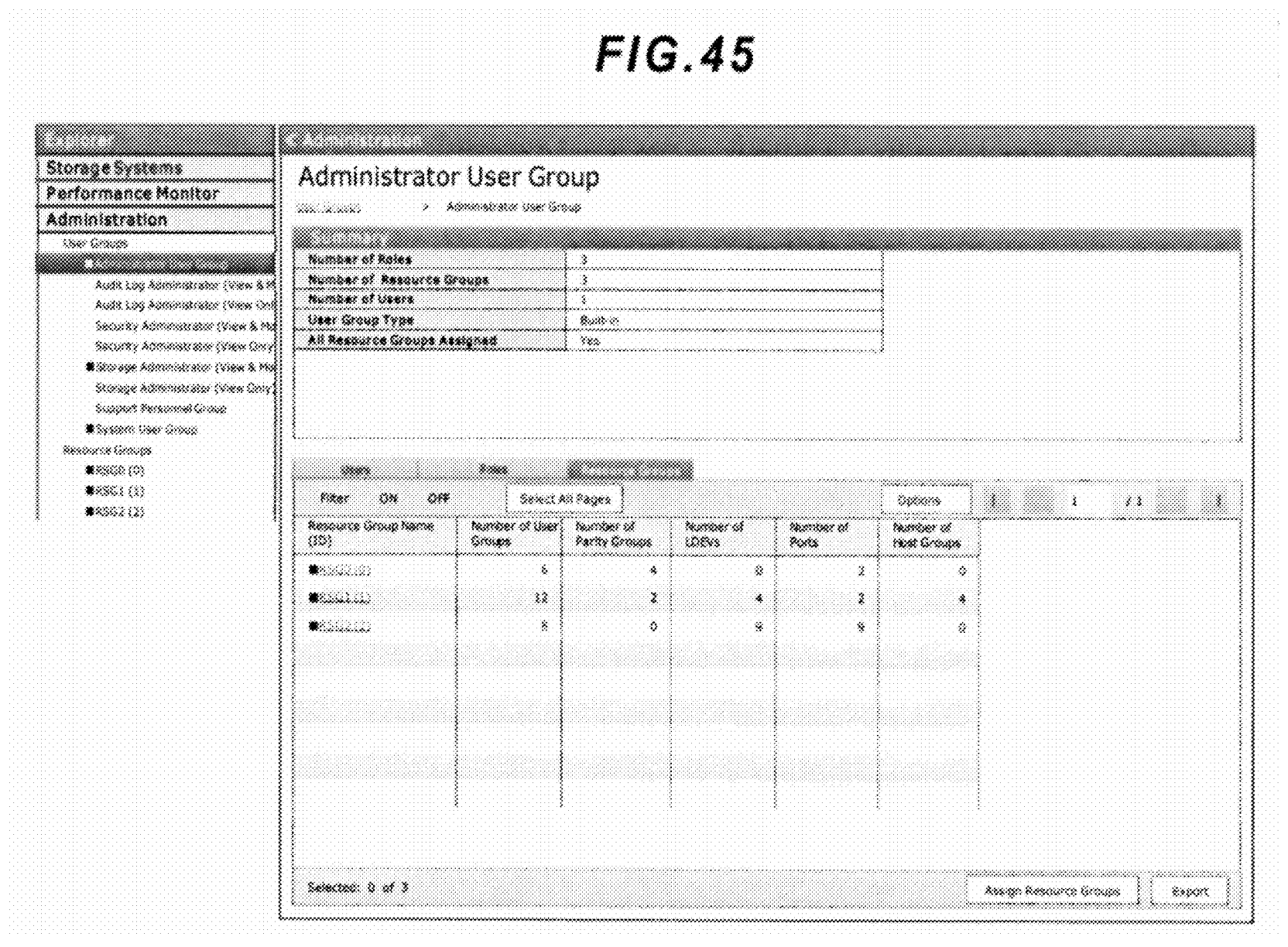

If an affirmative judgment is returned, the SVP sends the input information to the switch control module 110 for the storage system (1812). The processor module 104 updates and registers the resource group configuration information tables (FIGS. 5A, 5B to FIGS. 8A, 8B) and the resource group ID management table (FIG. 9) in the shared memory 102A based on the input information so that the content of these tables become the content of the RSG settings (1814); and the processor module 104 then sends the updated information to the SVP 108 via the switch control module 110. The SVP 108 configures the resource group ID bitmap (FIG. 16) based on the received information of the updated resource group configuration information tables (1816). The GUI of the external management terminal displays the relationship (the resource group ID bitmap table) between the resource group ID and its corresponding user group(s) based on the update information of the resource group ID bitmap (1820). If no user group is allocated to the resource group, the user group ID and the user group name are left blank. FIG. 45 shows a GUI screen displayed by the external management terminal in step 1820. If the management user selects a UG on the left side of the GUI screen, the right side of the screen will be switched to each relevant UG.

The configuration state of each resource after the execution of the above-described processing corresponds to the block diagram of FIG. 10 and each resource configuration information table becomes as shown in FIG. 19 to FIG. 22. Regarding these drawings, FIG. 19 is the configuration information table 1900 for LDEVs, FIG. 20 is the configuration information table 2000 for parity groups, FIG. 21 is the configuration information table 2100 for host groups, and FIG. 22 is the configuration information table 2200 for ports. Incidentally, if the storage system is exclusively owned by one company, the processing for partitioning the storage system to set a plurality of virtual systems is unnecessary.

Figure 23:
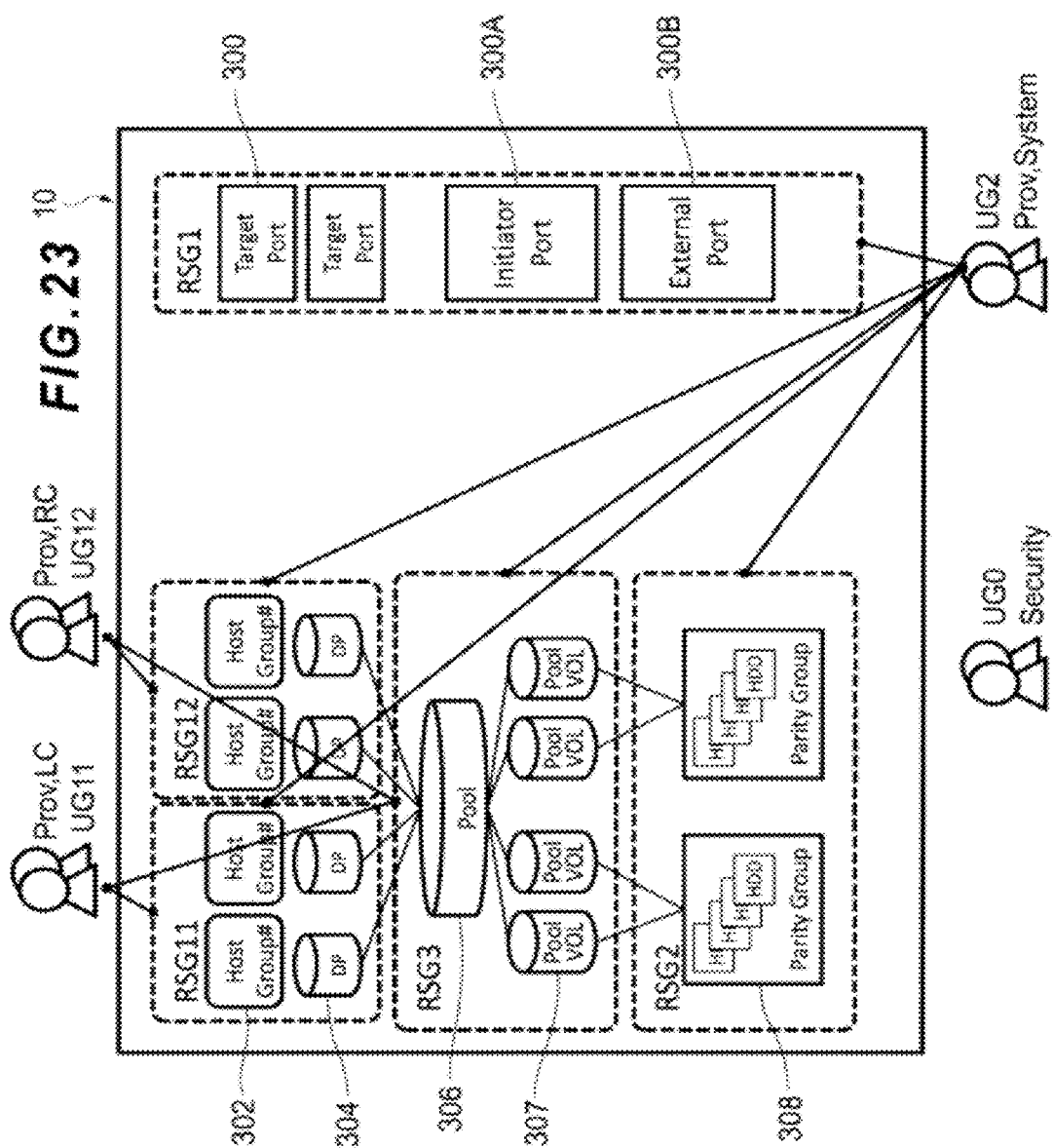
FIG. 23 is a block diagram of a virtual private storage system showing a state where a resource group allocated from the storage system to the virtual private storage system of a company is further partitioned and the partitioned resource groups are allocated to management user groups of the company.

If the storage system is partitioned into the virtual storage systems as described above, the resources of the virtual storage system are further partitioned for a plurality of management users in a company to which the virtual storage system is allocated, so that the partitioned resources are used for the operation in the company such as the operation of dynamic provisioning in the aforementioned example. FIG. 23 shows that a resource group (RSG2) allocated to company A is further partitioned and the partitioned resource groups are allocated to a plurality of management users for company A.

The overall management user group (UG0) partitions RSG2 and sets RSG1, RSG3, RSG11, and RSG12 to the virtual storage system for company A. UG0 fetches the physical resources (ports) from RSG2 and allocates them to RSG1. Furthermore, UG0 sets, as the logical resources, RSG3 which is constituted from the pool 306 composed of a logical storage area, and a plurality of pool volumes 307 allocated to the pool, and RSG11, RSG12, each of which is constituted from the host groups 302 and the virtual volumes 304.

Furthermore, UG0 sets a user group for the plurality of management users for company A. The user group UG2 has the access authority over all the resource groups for company A. This access authority includes Prov (provisioning authority) and System (system authority). The detailed content of this authority is shown in FIG. 15. The provisioning authority is a position capable of executing the operation necessary for dynamic provisioning and includes LDEV creation/deletion, creation/deletion of pool/pool volumes, DP-VOL (virtual volume) creation/deletion, creation/deletion of LU (logical module) accessed by the host computer, host group creation/deletion, and host addition/deletion.

The system authority is the authority capable of accessing the system configuration of the storage system and includes reference to system configuration information of the storage system, CLPR (partitioned memory areas for the cache memory) creation/deletion, setting of the microprocessor ownership, and changing the port attributes. The reference numeral 300 represents a target port, the reference numeral 300A represents an initiator port, and the reference numeral 300B represents an external port. Setting of the ownership to the microprocessor means to have a specific microprocessor exclusively own I/O processing on LDEVs from the host computer.

Each of UG11 and UG12 is allocated to RSGs (RSG11, RSG12, RSG3) constituted from the logical resources. UG11 and UG12 may be assumed to be user group(s) for administrators of business servers. RSG11 is exclusively allocated to UG11. RSG11 is a logical area for business server A. Similarly, RSG12 is exclusively allocated to UG12. RSG12 is a logical area for business server B.

Both UG11 and UG12 have provisioning authority, local copy (LC) authority, and remote copy (RC) authority. Regarding the details of each authority, see FIG. 15. It should be noted that a pair mentioned in FIG. 15 means a pair of a copy source volume and a copy destination volume and both volumes are set in the same storage system in a case of local copying. In a case of remote copying, the copy source volume is set in a primary storage system, while the copy destination volume is set in a secondary storage system located at a remote place away from the primary storage system.

The difference between the authority of UG2 and the authority of UG11 and UG12 is that the former has the system authority and the latter does not has the system authority. Even if the authority of a plurality of UGs is the same, the operation that can be, executed by a UG may be different from that executable by other UGs depending on what kind of resources are allocated to the relevant UG. A user belonging to UG2 can cut out the pool volume 307 from the parity group 308 and allocate it to the pool. On the other hand, a user belonging to UG11 or UG12 has the provisioning authority, so that they are allowed to create an LDEV, but cannot access RSG2 and, therefore, they cannot actually cut out the pool volume from the parity group. This is to prevent the occurrence of competitions between UG11 and UG12 to secure the parity group resources. So, the storage system 10 does not allocate RSG2 to UG11 or UG12 as described above, but it allocates RSG2 to UG2. Even if each of UG2, UG11, and UG12 is a UG having the same provisioning authority, it is possible to avoid competitions of logical resources between UG11 and UG12 because RSG2 is allocated to only UG2. Furthermore, since a host group is an attribute assigned to a port, and RSG1 is not allocated to UG11 and UG12, and UG11 and UG12 do not have the system authority, a user belonging to UG11 or UG12 may become subject to restrictions when defining and setting a host group. For example, the restriction may be set so that the user belonging to UG11 or UG12 cannot define or set a host group. Alternatively, when a host group is created for a port or a host is registered, only UG2 is permitted to set the host group ID and the provisioning authority of UG11 and UG12 can only assign a host group name to this ID. In this way, the actual form of the operation which can be executed by a user group is decided depending on the type of a resource group allocated to each user group (whether it is either a physical resource group or a logical resource group, or both of them) and the authority type.

With the virtual storage system, the physical resources such as the ports (RSG1) and the parity groups (RSG2), and the logical real volumes (pool volumes (RSG3)) are shared by a plurality of user groups, thereby making it possible to minimize and efficiently utilize the surplus capacity of the ports and volumes and perform the operation at reduced costs.

Furthermore, capacity virtualization and facilitation of capacity addition can be realized by using a pool function of dynamic provisioning.

Regarding RSG11 and RSG12 which are assumed, for example, to be allocated to each division in the company, UG11 and UG12 which manage them can secure and operate their dedicated resources which will not mutually interfere. Furthermore, as each of RSG11 and RSG12 is composed of only the logical resources, addition of the capacity to the pool and performance management of the parity groups are delegated to a specific user group (UG2); and, therefore, even users (UG11, UG12) who are unfamiliar with the system can perform management activities.

With the above-described embodiment where a plurality of virtual systems are partitioned in the storage system, a storage group having the physical resources is not shared by the entire storage system, but is limited to sharing by users in the virtual system (in one company). Accordingly, the difference between a conventional resource partitioning technique (SLPR) and the present invention is that the resources are shared between some users (between users in company A and between users in company B) according to this invention. Furthermore, the conventional SLPR can configure only a virtual storage system that traverses longitudinally from the frontend (ports) of the storage system to its backend (parity groups); however, with the system according to this embodiment, it is possible to freely group the resources in a cross-sectional manner to form, for example, a resource group of the host groups and the logical volumes, a resource group of the pool and the logical volumes, and a resource group of the parity groups, and achieve efficient utilization of the resources by suppressing surplus resources.

Figure 24:
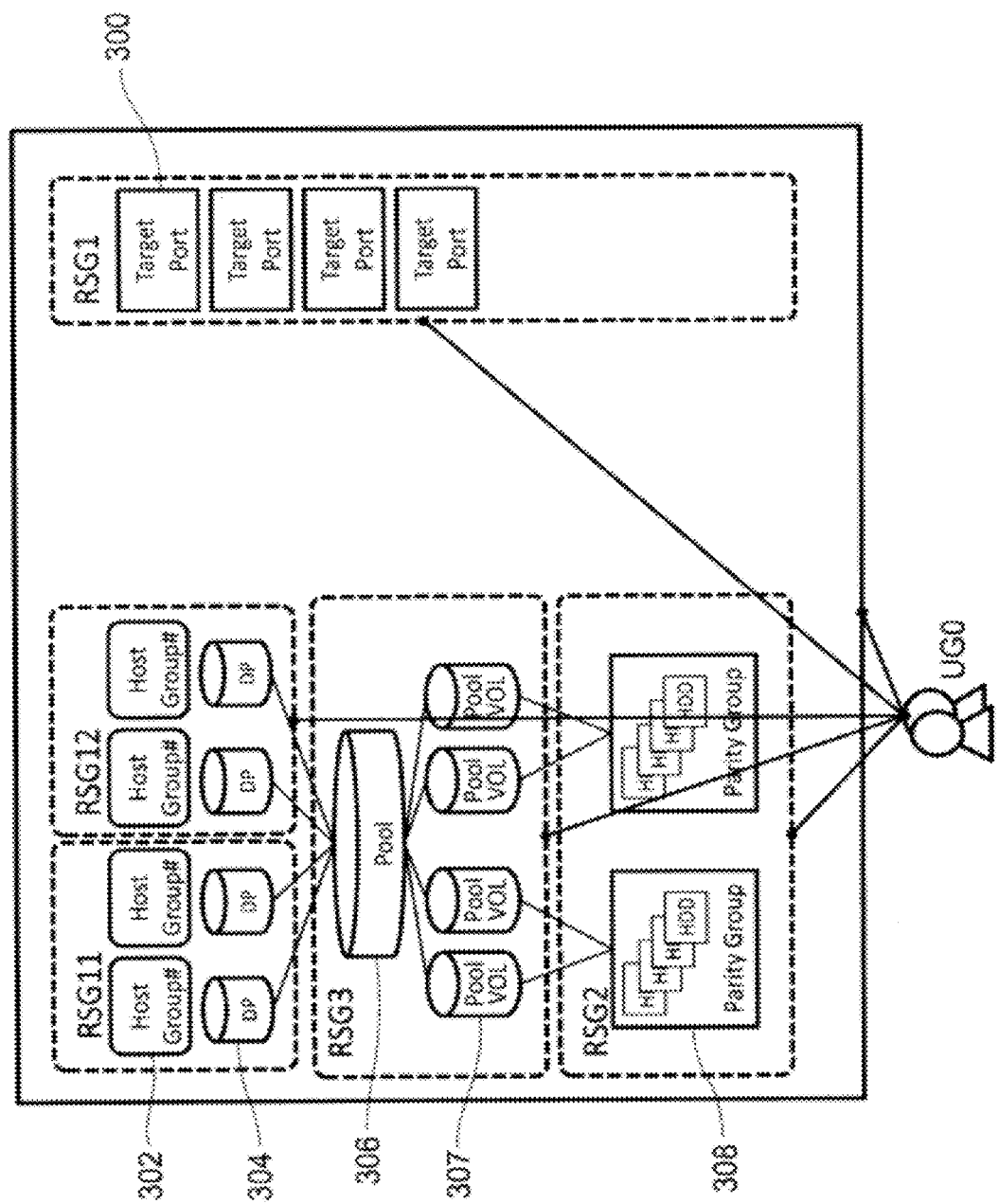
FIG. 24 is a block diagram of a virtual private storage system showing a state where a resource group allocated from the storage system to the virtual private storage system of a company is further partitioned and the partitioned resource groups are allocated to a user group for the overall management of the storage system.
Figure 25:
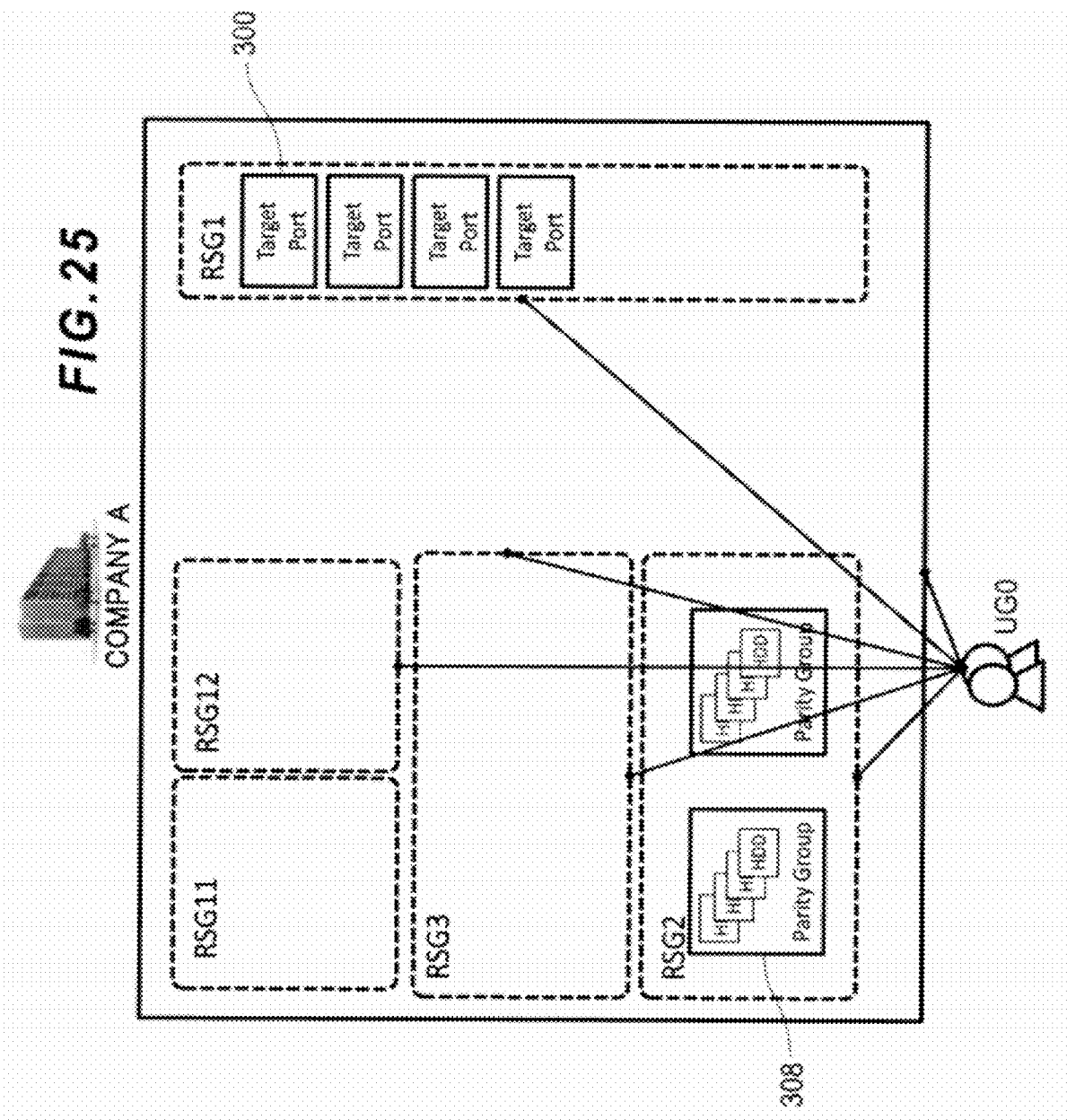
FIG. 25 is a block diagram of a virtual private storage system before operation before resource groups of logical resources are set to the virtual private storage system.

The overall management user group (UG0) of the storage system, who has the security authority, creates a resource group in the virtual storage system (see FIG. 24). It is also possible to grant the security authority to the user (UG2) of company A and have that user create RSGs for company A; however, if the security authority is granted to the user (UG2) of company A, the user (UG2) will be able to refer to not only the resources for company A, but also the resources for company B, which will bring about a security problem. So, even after partitioning the resources for each company, UG0 will perform RSG creation/deletion for the companies and addition/deletion of the physical resource to/from the RSGs. Therefore, with the system before starting the operation as shown in FIG. 25 where the physical resource groups (RSG1, RSG2) exist, but the logical resources have not been set to the resource groups (RSG3, RSG11, RSG12), the user UG0 can define and set the logical resources to the resource groups based on an operation plan of company A or operation suggested to company A, there by completing the aforementioned virtual storage system. Incidentally, the external management terminal 20 may limit access to the logical resource groups by the overall management user group (UG0) of the storage system. Incidentally, there may be a user group to which the security authority that is valid for only company A or B, that is, the security authority targeted at an arbitrary resource group is set.

Figure 18:
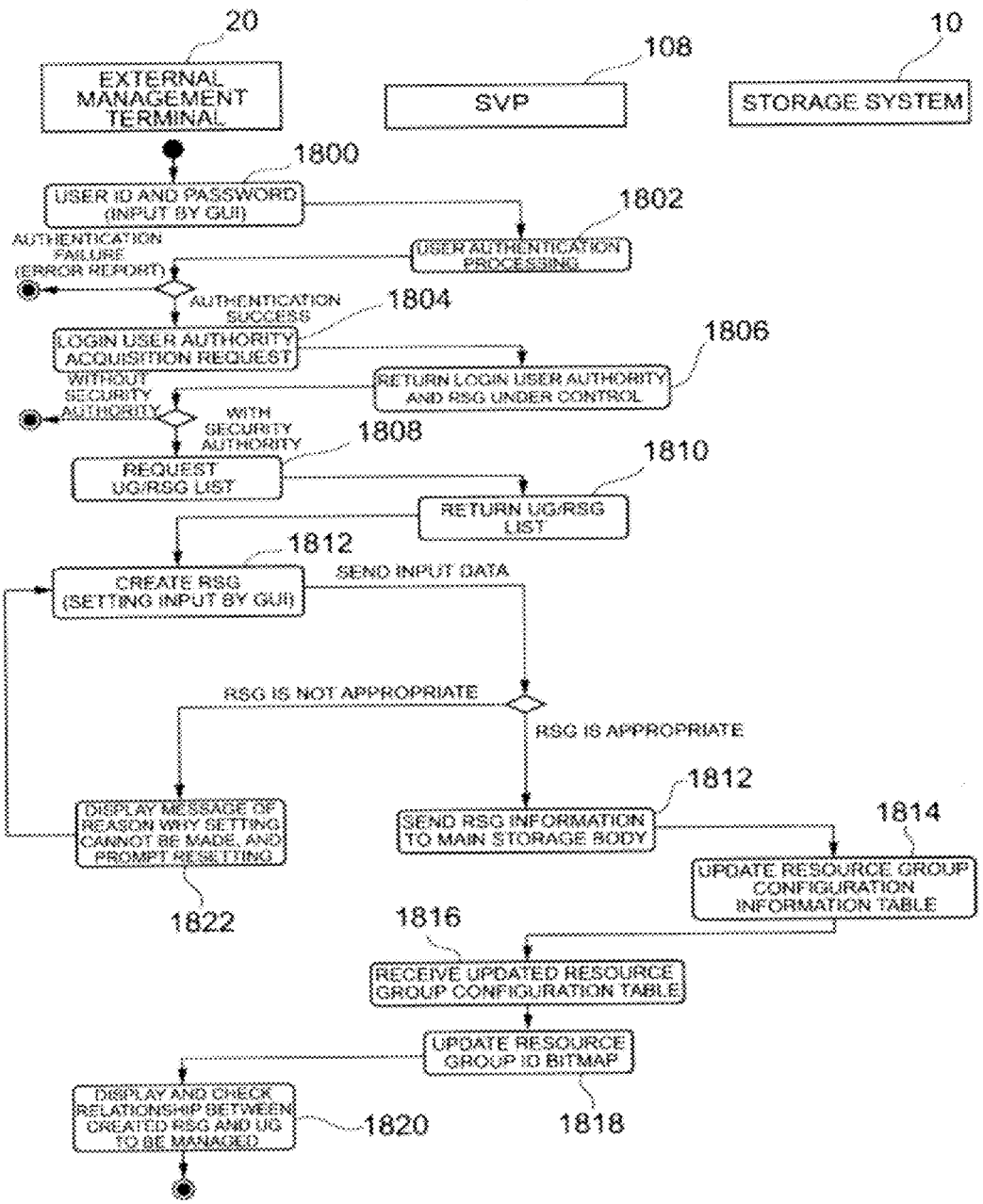
FIG. 18 is an example of a flowchart for logically partitioning the storage system into systems, each of which is provided for each of a plurality of companies.
Figure 26:
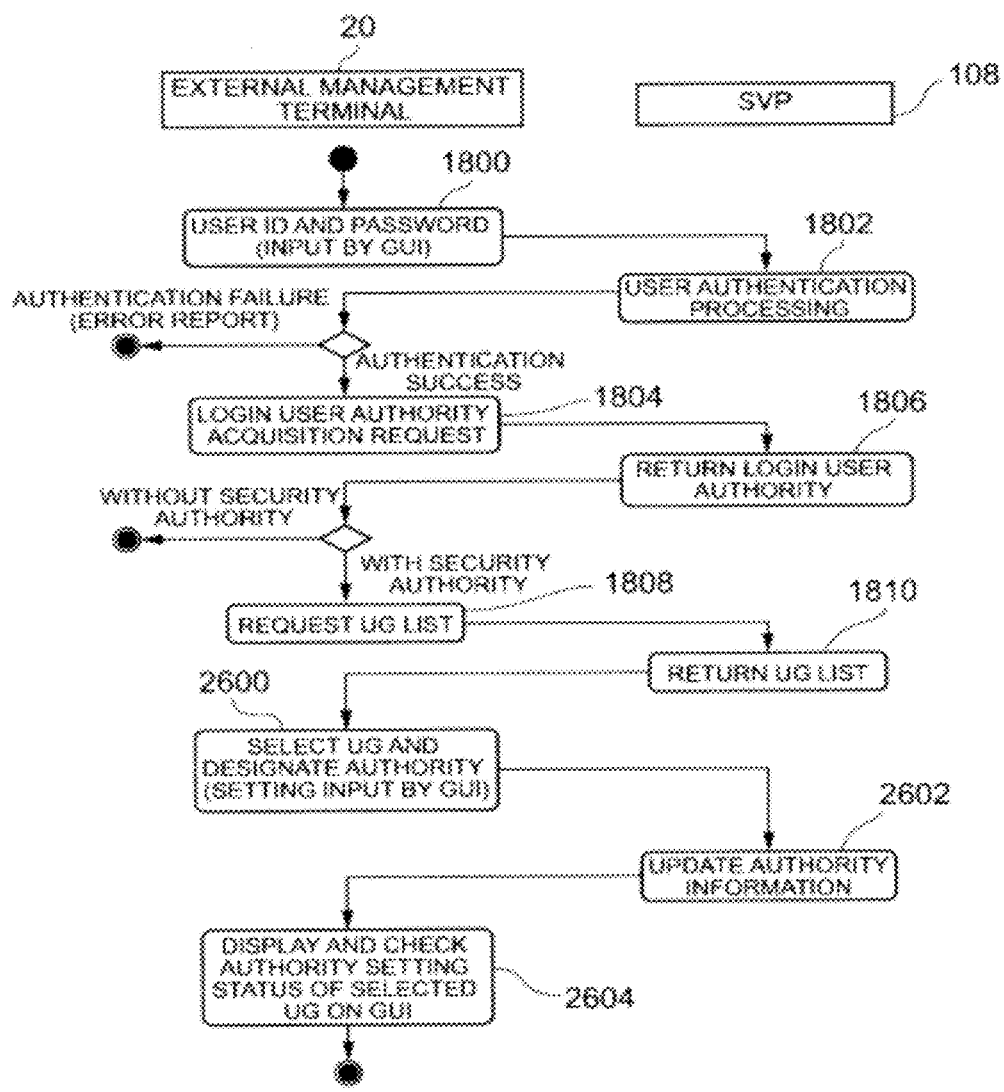
FIG. 26 is a flowchart illustrating an example of processing for allocating authorities to the user group(s).

Next, various processing relating to the setting of resource groups in the virtual storage system will be explained with reference to flowcharts. FIG. 26 is a flowchart for assigning the authority to a user group. This setting is permitted to the user UG0. Processing after the user login until the external management terminal 20 receives the user group list from the SVP (1800 to 1810) is the same as the processing in the aforementioned flowchart (FIG. 18). The login user sets or selects a new user group on the GUI of the storage management software, sets the authority to the relevant user group, and updates the authority of the existing user group or sets new authority to the existing user group, and send the input data to the SVP (2600). The SVP searches the authority bitmap table (FIG. 13) for the user group selected or set on the GUI and sets [1] to a bit(s) in which the authority is set or updated (2602). Incidentally, when a user group is newly set, each bit of the authority bitmap is [0].

If the authority which does not conform to the existing authority is set to a user group to which the authority has already been set, the SVP 108 sends a warning message to the management terminal. For example, that would be a case where the authority over the physical resources is set to a user group to which the authority over the logical resources has been set. Specifically speaking, that would be a case where an attempt is made to set the system authority to UG11 or UG12. The same can be said for a case where the authority to be set does not conform to the resources allocated to the user group. For example, that would be a case where no physical resource exists in the resource group, but an attempt is made to assign the authority relating to the system. The specific details will be further explained below. It is inappropriate for a UG having only the above-described LC authority to have the system authority for operating the physical resources. However, in a case where an attempt is made to set the ownership to primary and secondary LDEVs for remote copying, the system authority is required. In this case, referring to FIG. 23, user(s) of the primary and secondary LDEVs will have to request UG2 to set the ownership. However, since UG11 and UG12 do not have much storage knowledge and management knowledge to be capable of performing such operation, resource groups to be allocated to such user groups are limited. A warning message would state as follows: The relevant UG will become capable of **; however, is that authority truly necessary? The user who receives this message replies YES or NO to select whether they would like to proceed with the processing or not.

Figure 46:
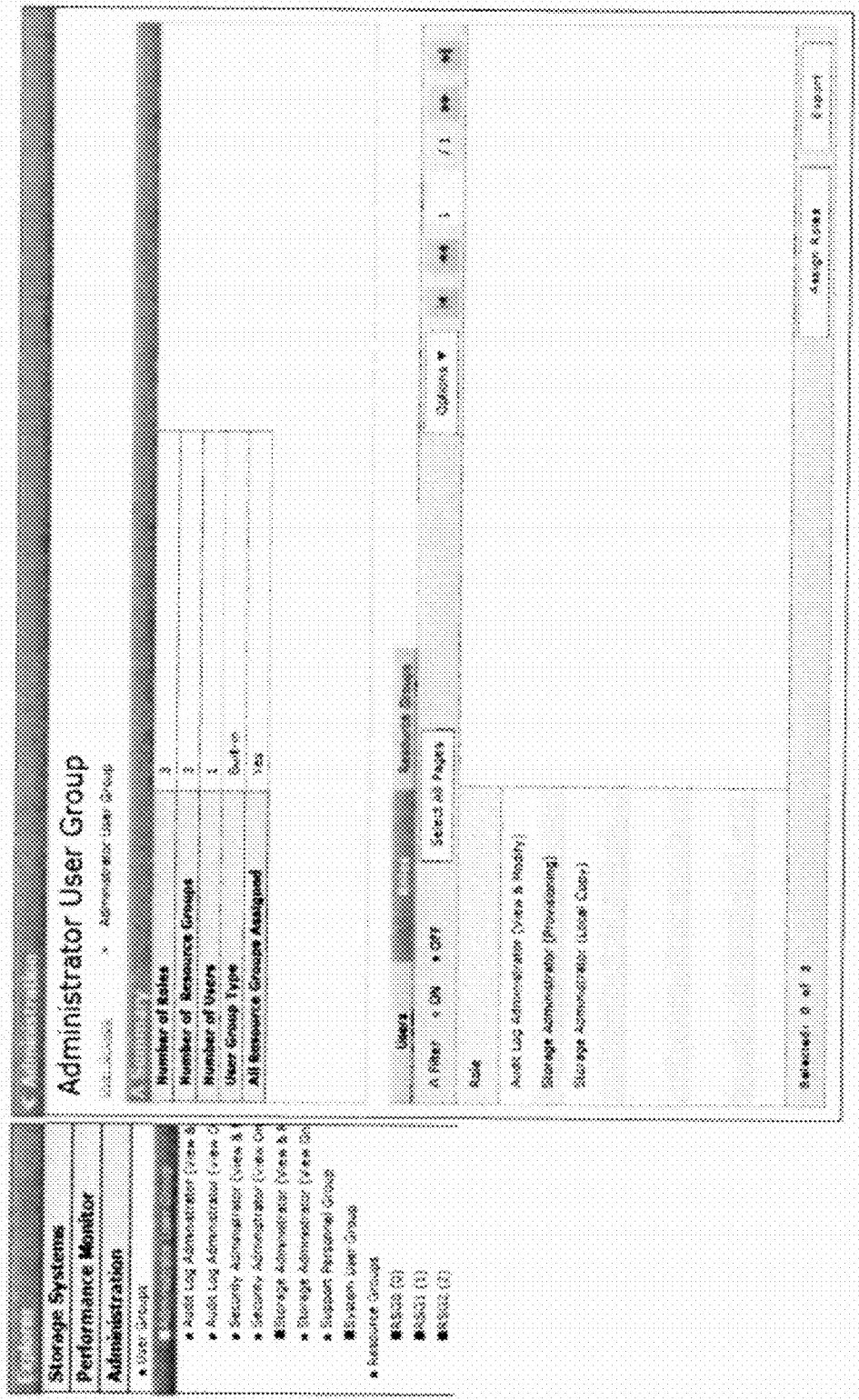
FIG. 46 is a GUI screen displayed by the external management terminal in step 2604 of FIG. 26.

If the authority information is finally updated on the SVP 108 side, that information is sent to the management terminal 20 and authority setting information is displayed on the GUI to ask for confirmation by the user; and if the user confirms it, the authority is finalized (2604). FIG. 46 shows a GUI screen displayed by the external management terminal in step 2604. If the management user selects a UG on the left side of the GUI screen, the right side of the screen will be switched to each relevant UG.

After the termination of the processing on the user login, processing for creating an RSG(s) in the virtual private storage system for the company and allocating it to the user group is then required. This processing is shown in a flowchart of FIG. 27. Since an RSG is to be created, the login user has to be a user belonging to the user group (UG0) with the security authority. Processing steps after the user logs into the external management terminal 20 until the storage management software receives the resource group list and the user group list from the SVP (1800 to 1810) are the same as those in FIG. 18 described earlier.

Next, the login user (UG0) sets new RSGs (RSG1, RSG3, RSG11, RSG12) on the GUI by allocating resources from the existing RSG2 to the new RSGs (RSG1, RSG3, RSG11, RSG12), and sends input information to the SVP 108 to request, for example, setting of RSGs (2700).

After receiving this request, the SVP 108 judges whether this request is appropriate or not. This judgment includes the following judgment A, judgment B, and judgment C. Judgment A is to judge whether the physical resources and the logical resources are independent of each other with respect to an RSG to be set. It is normally inappropriate to let both the physical resources and the logical resources coexist in the same RSG. If a plurality of user groups (UG11, UG12) for the logical resources are allowed to access the physical resources, competitions of the physical resources will arise between the users. However, for example, if sufficient ports are mounted on the storage system, it is possible to include the ports in RSG11 and RSG12 and design the configuration so that RSG11 and RSG12 will not be affected at all by I/O of other RSG/UG combinations.

After partitioning and creation of an RSG, it is necessary to change the setting of the physical resources, define the logical resources from the physical resources, and allocate them to the RSG which consists of logical resource(s); and, therefore, judgment B checks if all the RSGs (RSG1, RSG2, RSG3, RSG11, RSG12) are allocated to the user group (UG2) which has the overall management authority over the virtual storage system, that is, the authority over the physical resources (system authority) and the authority over the logical resources (provisioning authority). The authority may be distributed among a plurality of UGs having the same authority.

Figure 28:
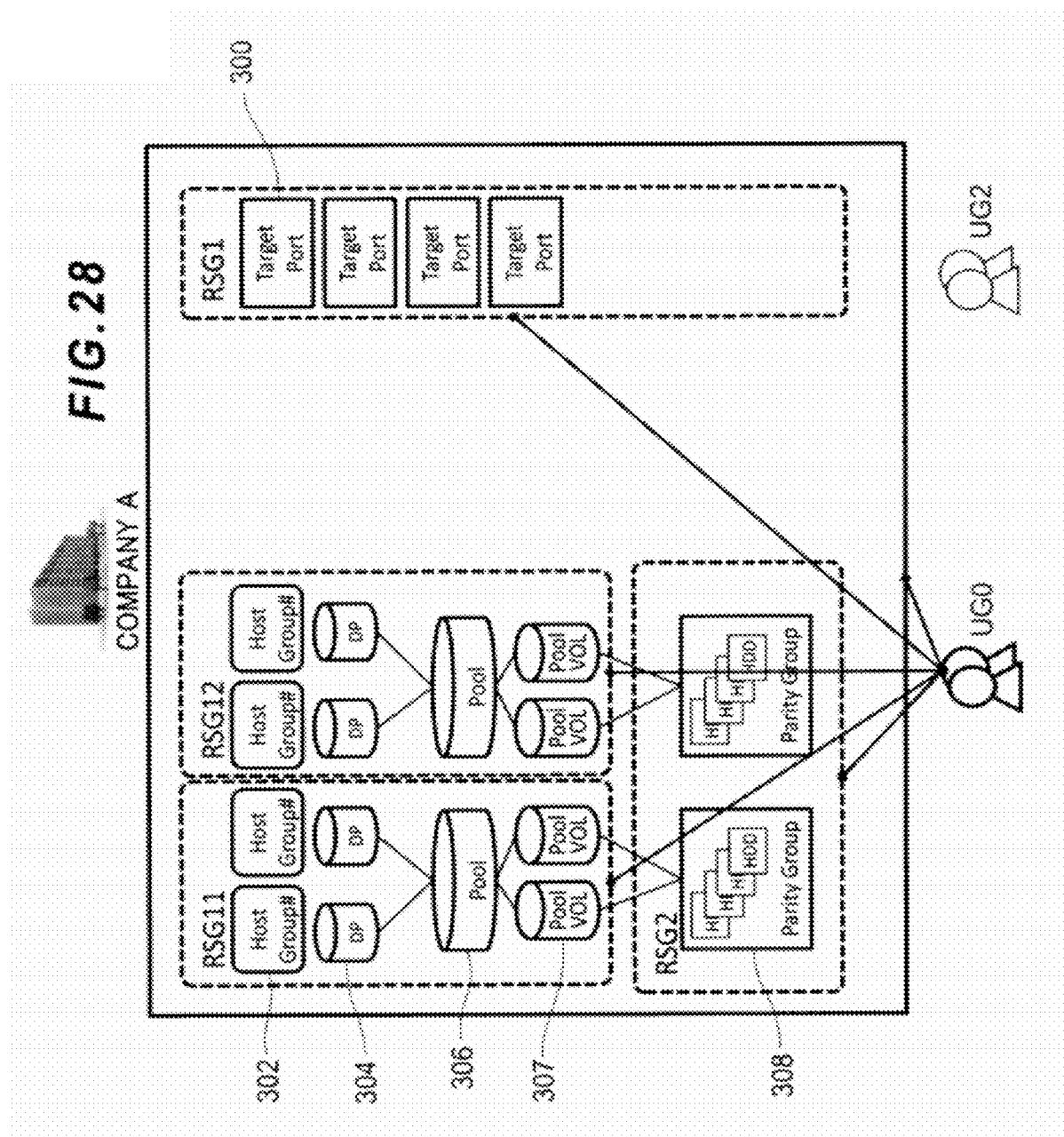
FIG. 28 is a block diagram showing a second example of a configuration form of a plurality of resource groups in an in-house virtual private storage system.

Judgment C judges suitability of the setting form of the resource group(s) constituted from the logical resources. It is a matter of course that the setting form shown in FIG. 24 described earlier is appropriate. Furthermore, the pool 306 and the pool volumes 307 may be exclusively owned by RSG11 and RSG12, respectively, as shown in FIG. 28.

Figure 29:
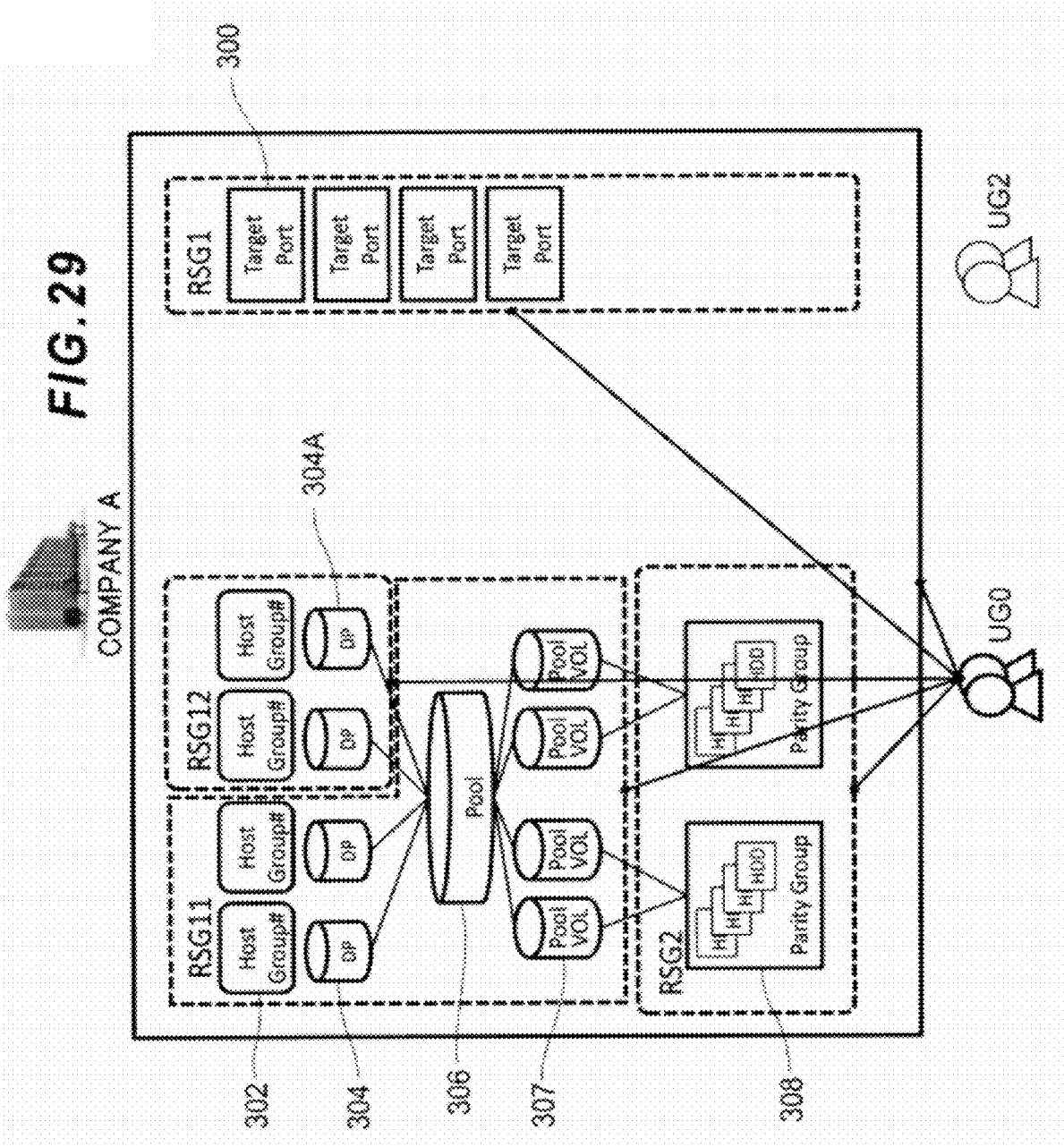
FIG. 29 is a block diagram showing an inappropriate example of a configuration form of a plurality of resource groups in the in-house virtual private storage system.

On the other hand, FIG. 29 shows an example where the resource groups are not set appropriately in the virtual private storage system. Specifically speaking, the logical resources constituted from the pool 306 and the pool volumes 307 belong to a logical resource group RSG11 exclusively owned by a specific user group (UG11) and virtual volumes 304A of RSG12 are allocated to the pool 306, so that it is necessary for UG12 (FIG. 23) to refer to the pool 306 and the pool volumes 307 of RSG11 in order for UG12 to operate the logical resources of RSG12; however, this results in the situation that UG12 can refer to the information of the logical resources such as the host groups 302 of RSG11, which will cause problems in terms of security.

Therefore, as a result of the judgment C (2706), an affirmative judgment is returned with respect to the form where the resource groups of the logical resources exclusively owned by UG11 and UG12 respectively are provided (FIG. 28), and the form where the resource groups of the logical resources exclusively owned by UG11 and UG12 respectively, and the resource groups of the logical resources shared by UG11 and UG12 are provided (FIG. 24). Incidentally, with respect to the form in FIG. 28, a plurality of RSGs (RSG11, RSG12), where the pool volumes 307 are created, exist for capacity shortage which is predicted to occur most frequently during the operation, so it is feared that the management performed by UG2 might become complicated.

The resource group configuration information table of each resource corresponding to the form in FIG. 23 is as shown in FIG. 30 to FIG. 33. Also, the resource group ID bitmap is as shown in FIG. 16 described earlier. On the other hand, the resource group configuration information table of each resource corresponding to the form in FIG. 28 is as shown in FIG. 34 to FIG. 37. Also, the resource group ID bitmap is as shown in FIG. 38.

The difference between the resource group the bitmap (FIG. 16) for the form in FIG. 23 and the resource group the bitmap (FIG. 38) for the form in FIG. 28 is whether or not UG11 and UG12 share the fourth bit in the resource group ID bitmap, that is, RSG3. Another difference between the form in FIG. 23 and the form in FIG. 28 is whether the LDEVs are shared or not. In the former case, the pool volumes are shared. In the former form, UG11 and UG12 share RSG3 according to FIG. 16 and RSG3 includes LDEV IDs (=0x000004 to 0x000007) according to FIG. 30. These LDEV IDs are pool volumes according to FIG. 39. As a result, it can be judged that UG11 and UG12 share the LDEV IDs (=0x000004 to 0x000007) which are the pool volumes, via RSG3.

In the form in FIG. 28, the virtual volumes and the pool volumes are exclusively owned by the user groups. According to FIG. 38, UG11 and UG12 exclusively own RSG11 and RSG12, respectively. As shown in FIG. 34, RSG11 includes LDEV IDs (=0x000000, 0x000001, 0x000004, 0x000005) and RSG12 includes LDEV IDs (=0x000002, 0x000003, 0x000006, 0x000007). According to FIG. 39, RSG11 and RSG12 include both the virtual volumes and the pool volumes. As a result, both UG11 and UG12 exclusively own the virtual volumes and the pool volumes. Incidentally, referring to FIG. 39, a DPVOL is a logical volume without real capacity; a basic VOL is a logical volume with real capacity; no attribute means that the relevant volume is a virtual volume; and if the attribute is a pool volume, it means the logical volume with real capacity is intended to add the capacity to the pool.

Figure 27:
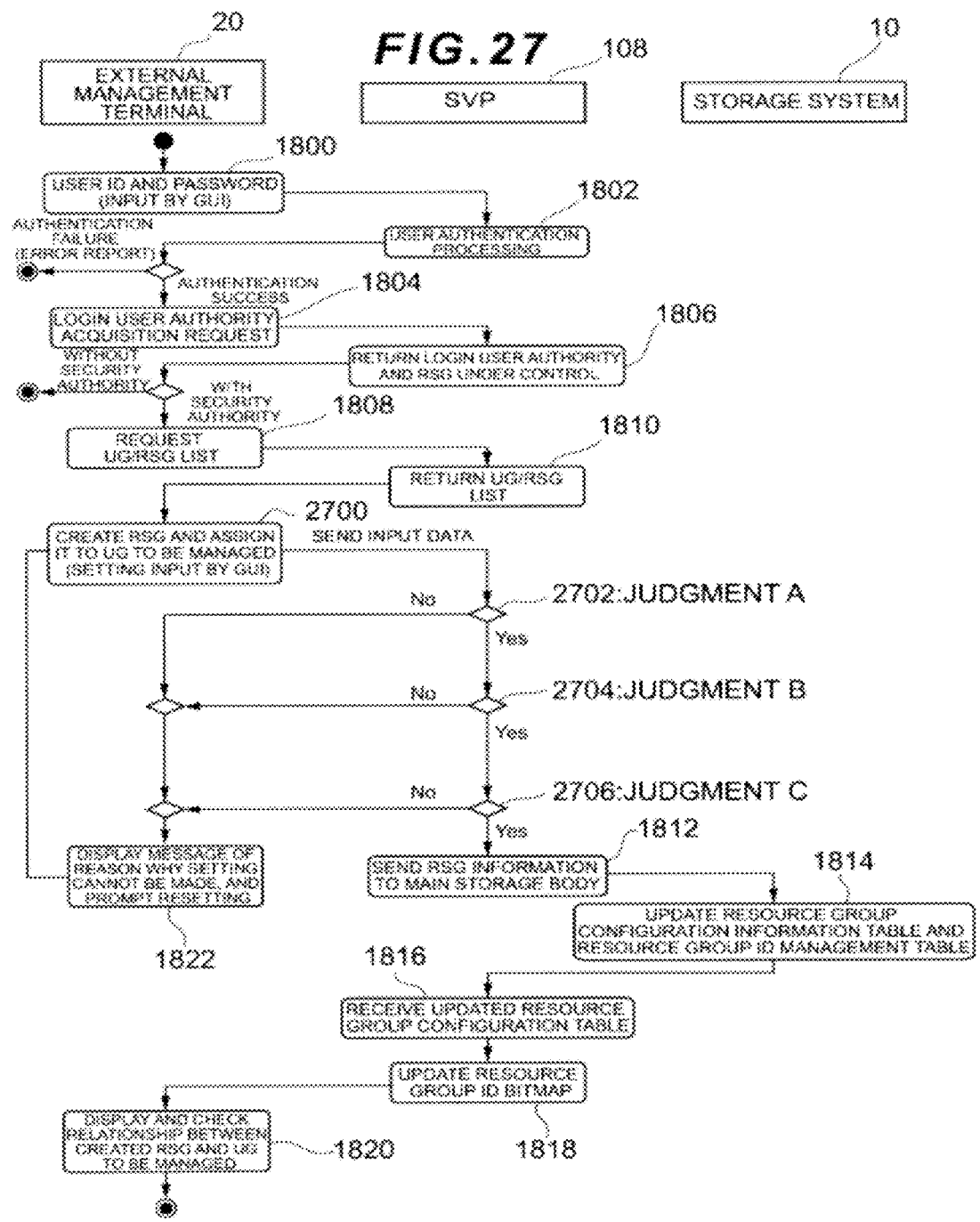
FIG. 27 is a flowchart corresponding to processing for creating a resource group in the virtual private storage system of a company and allocating it to a user group(s) in the company.

Referring to FIG. 27, the processing in and after step 2706 is the same as steps 1814 to 1822 in FIG. 18.

Figure 40:
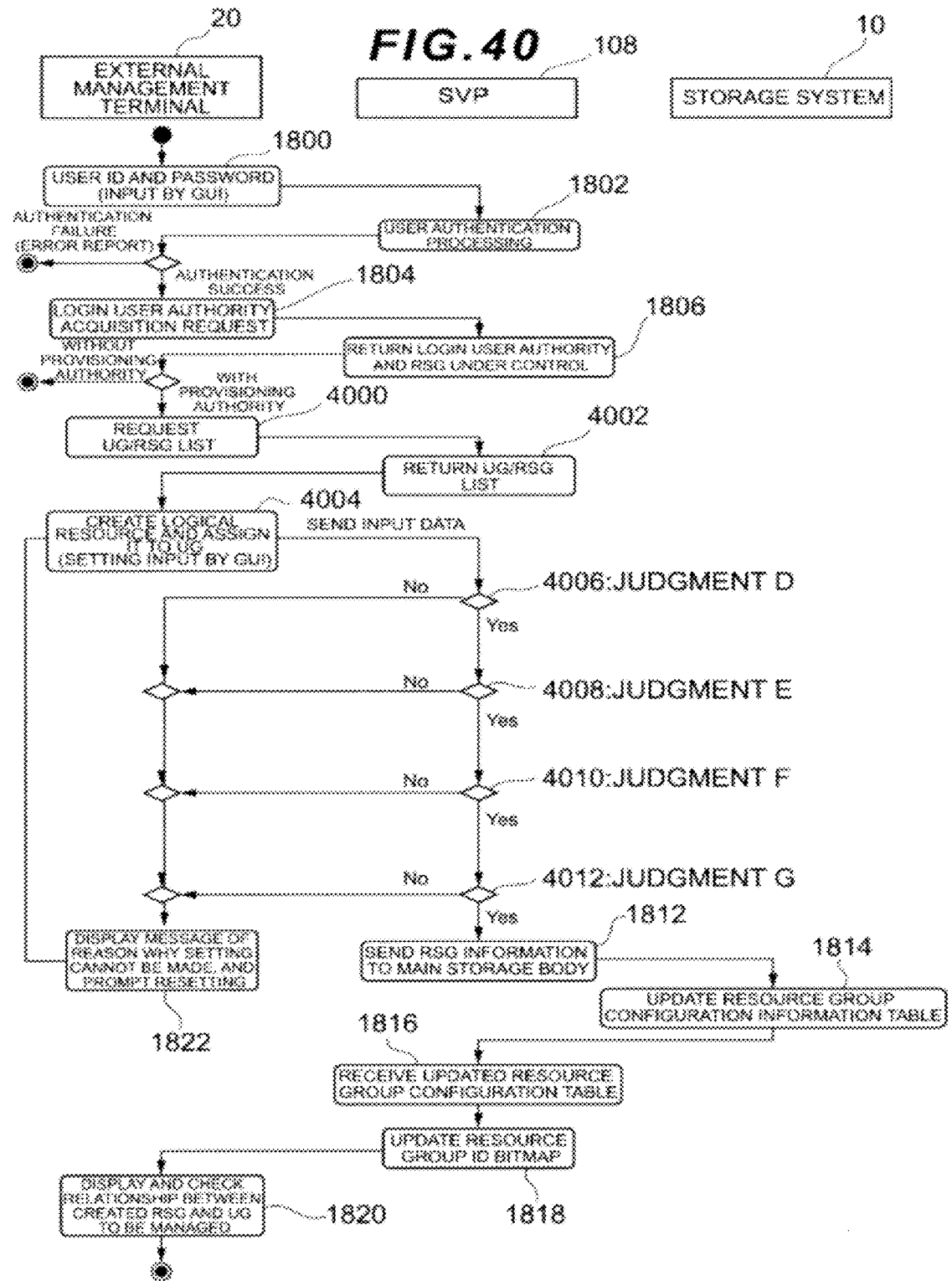
FIG. 40 is a flowchart illustrating an example of processing for cutting out a logical resource from a resource group of a physical resource and setting it to a resource group of a logical resource.
Figure 41:
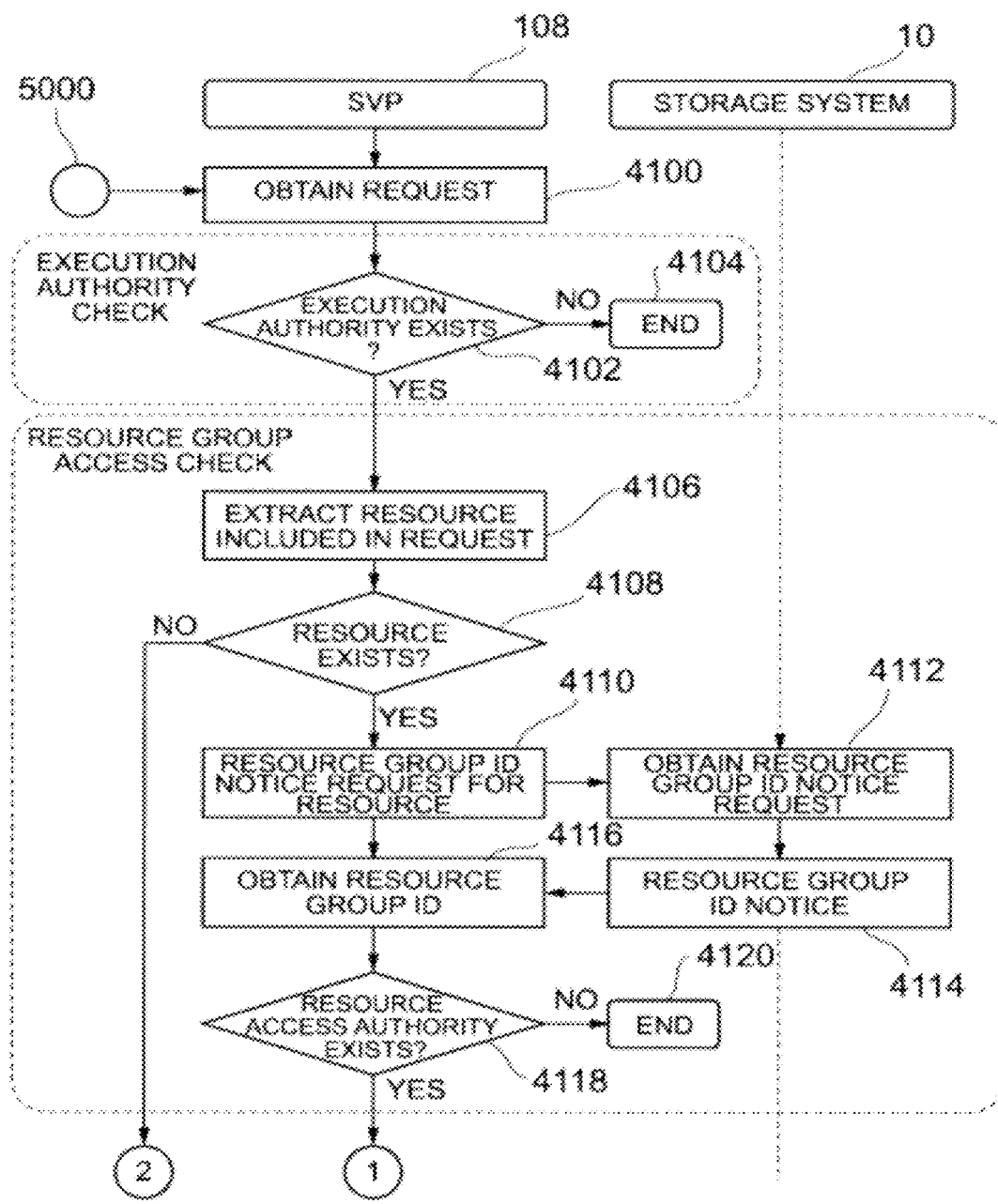
FIG. 41 is a flowchart illustrating first processing in the operation of the computer system.

As shown in FIG. 27, during, or after the completion of, the processing for partitioning RSG2 into a plurality of resource groups, it becomes necessary to create and allocate a logical resource and perform various settings. UG2 is granted the provisioning authority, the system authority, and the remote copy authority as mentioned earlier. Allocation of the authority and resource groups to UG2 is performed by UG0 having the security authority in accordance with FIG. 26 and FIG. 27. UG2 which is granted the authority and resource groups by UG0 defines logical resources, which are the host groups 302, under the control of the target ports 300 and allocate them to RSG11 and RSG12. In addition, UG2 allocates the virtual volumes 304 to RSG11 and RSG12. Then, UG2 cuts out the real logical volumes (pool volumes) from RSG2, where the physical resources exist, and allocates them to RSG3. A flowchart relating to this processing sequence is shown in FIG. 40. Incidentally, it is necessary to change the attribute of the ports in order to connect to the external storage apparatus or perform remote copying, which will be also executed by UG2 having the system authority.

Regarding the flowchart in FIG. 40, the processing after the user login until the external management terminal receives information about the authority of the login user and the resource groups under the control of the login user (step 1800 to step 1806) is the same as that in FIG. 18. After the storage management software for the external management terminal 20 confirms the provisioning authority to enable creation of a logical resource, the external management terminal 20 requests the user group list and the resource group list from the storage management software for the SVP 108 (4000) and receives them returned from the SVP. The details of this processing are the same as those in step 1808 to step 1810 in FIG. 18. Subsequently, the login user inputs data to the GUI to define a logical resource from the physical resource and allocate the defined logical resource to the logical resource group (4004). The external management terminal 20 sends the input information to the SVP 108.

The SVP which has received the transmitted input data judges whether the input data is appropriate or not, by performing judgment D to judgment G. Judgment D (4006) judges whether or not a logical resource can be created with the authority of the user group, to which the login user belongs, and the allocated resource group; judgment E (4008) judges whether the use of the physical resources is imbalanced or not when cutting out the logical resource from the physical resource; and judgment F (4010) judges whether the logical resource is not allocated to the resource group of the physical resource; and judgment G (4012) judges whether the form of the virtual storage system is not inappropriate (as in, for example, the form in FIG. 29). Processing after the judgments is the same as that in the flowcharts in FIG. 18 and FIG. 27. The details of each judgment will be explained below.

Judgment D

UG2 has the operation right on RSG1, RSG2, RSG3, RSG11, and RSG12 as shown in the resource group ID bitmap in FIG. 16. Since RSG2 (which owns the parity groups), which is the physical resource, is allocated to UG2, it is possible to create a logical volume (LDEV) which is a logical resource. Furthermore, since RSG1 (which owns the target ports) is allocated to UG2, the host group which is similarly a logical resource can create a host group. If the login user belongs to UG2, an affirmative judgment is returned for judgment D.

Since both UG11 and UG12 have the provisioning authority, they are permitted, in terms of the authority, to create logical resources such as LDEVs and host groups. However, according to the resource group ID bitmap in FIG. 16, RSG1 and RSG2 which are the physical resource are not allocated to UG11 and UG12. So, in fact, UG11 and UG12 cannot create logical resources. Therefore, if the login user belongs to UG11 or UG12, a negative judgment is returned for judgment D.

Regarding the operation of UG11 and UG12, the GUI operation to create an LDEV or a host group may be inhibited from the beginning by not displaying the physical resources of RSG1 and RSG2 when the GUI obtains the UG/RSG. However, if it is possible to create various types of resources by means of not only the GUI, but also by use of a CLI (command line interface) by the login user, it is necessary to check whether such creation of the resources is possible or not, by using the external management terminal or the storage system. In this case, the judgment D step by the SVP will be omitted.

Judgment E

For example, if a plurality of target ports exist, but the host groups are set to only a certain port, load will be concentrated on that port and load distribution to other ports will not be achieved. Also, the same applies to a case where a plurality of parity groups exist, but LDEVs are created only in a certain parity group. Judgment E is performed to make sure that there is no such imbalanced use. This judgment makes use of reference by the SVP 108 to performance information such as availability of the targets ports and the parity groups in the shared memory 102. Furthermore, since such performance information can be checked also on the GUI of the storage management software, an appropriate resource may be selected on the GUI. The judgment in this case will be performed by the user belonging to UG2 who is the login user.

Judgment F

The login user can define a logical volume from RSG2 (which owns the parity groups), which is the physical resource group, and make it belong similarly to RSG2. However, since UG11 and UG12 which handles only the logical resources cannot allocate RSG2, the logical volume can no longer be used. Therefore, a request for such logical resource setting is impossible.

Judgment G

Judgment G judges whether either the following condition (1) or (2) is satisfied or not: (1) if UG11 and UG12 have only RSGs of their exclusively owned logical resources, the host groups, the virtual volumes, and the pool volumes are allocated to their own RSGs; and (2) if UG11 and UG12 have RSGs of their exclusively owned logical resources and mutually shared RSGs of logical resources, the host groups and the virtual volumes are allocated to the former RSGs and the pool volumes are allocated to the latter RSGs. According to the conditions (1) and (2), dynamic provisioning can be performed on UG11 and UG12 and security can be ensured.

After the completion of RSG partitioning and resource allocation, the login user (UG2) performs, via the SVP 108, registration of the host computer and a path definition between the LU (logical unit(s)) and the host computer and then has the virtual storage system for company A make the transition to the operating state. Since both UG11 and UG12 have the provisioning authority, it is possible to register the host computer and define a path to the LU (logical unit) within the range of the authority. When doing so, the login user selects the pool to be used by the virtual volumes from RSG3 (FIG. 24). As a result, RSG11 and RSG12 can access read and write I/O from the host computer.

UG11 and UG12 can perform local copying within their own RSGs by exercising the local copy authority. Regarding remote copying, various settings across different storage systems such as creation of a remote copy pair are performed by the user group (UG0) for the overall management. Only instructions to start or terminate the copying processing are permitted to UG11 and UG12 with the remote copy authority.

When creating a resource group according to the above-described embodiment, the management user sequentially input a plurality of pieces of setting information via the GUI of the external management terminal 20; however, the SVP 108 may register a file, in which policies about the configuration of resource groups are described, in advance and judge whether input by the user is appropriate or not, based on the policy file.

An example of the policy file is as follows:

(A) Policies for realizing the resource groups in FIG. 24

(1) Physical resources (parity groups) should be shared by a plurality of users (user groups).

(2) Physical resources (ports) should be shared by a plurality of users.

(3) Logical resources (host groups) should be exclusively owned by the relevant user(s).

(4) Logical resources (LDEVs)

Virtual volumes should be used and exclusively owned by the relevant user.

Pool volumes (pools) should be shared by a plurality of users.

(B) Policies for implementing the resource groups in FIG. 28

(1) Physical resources (parity groups) should be shared by a plurality of users (user groups).

(2) Physical resources (ports) should be shared by a plurality of users.

(3) Logical resources (host groups) should be exclusively owned by the relevant user.

(4) Logical resources (LDEVs)

Virtual volumes should be used and exclusively owned by the relevant user.

Pool volumes (pools) should be exclusively owned by the relevant user.

Next, the operation of the computer system shown in FIG. 1 will be explained with reference to flowcharts in FIG. 41 to FIG. 44. While the aforementioned flowcharts correspond to the form in FIG. 23, FIG. 41 to FIG. 44 show general purpose flowcharts that can be applied to forms other than that in FIG.

23. These flowcharts show continuous processing. The SVP 108 obtains a request from a login session based on a login session 5000 of the user (4100). The request herein means operation permitted for each authority. The management software which has received this request checks the execution authority of the login user (4102); and if this check is negated, the processing of the flowchart terminates (4004); and if this check is permitted, the processing proceeds to the next step. This check is performed in the following manner. The SVP refers to the authority table in FIG. 15 and extracts the corresponding authority from the operation content of the request (4106). The SVP 108 refers to the authority bitmap (FIG. 13) allocated to the login user and checks if the corresponding authority is included in the request (4102). If the corresponding authority is included in the request, the SVP determines that the execution authority exists, and then proceeds to a resource group access check. If the corresponding authority is not included in the request, the SVP jumps to the flowchart in FIG. 43 (4300).

During the resource group access check processing (4108), the SVP firstly extracts a resource included in the request (4106). After the resource is extracted, the SVP identifies the resource group ID of a resource group to which the relevant resource belongs, according to information cached in the SVP. If the SVP has not cached this information, it requests that the storage system should report the resource group ID (4110). After obtaining this request (4112), the storage system refers to the configuration information table 202B for the shared memory 102A, obtains the resource group ID, and notifies the SVP of the resource group ID (4114). The SVP obtains the resource group ID (4116) and judges whether the authority over this resource group exists or not (4118). If an affirmative judgment is returned, the processing proceeds to the exclusive control processing in FIG. 42. If a negative judgment is returned, this processing terminates (4120)

Figure 42:
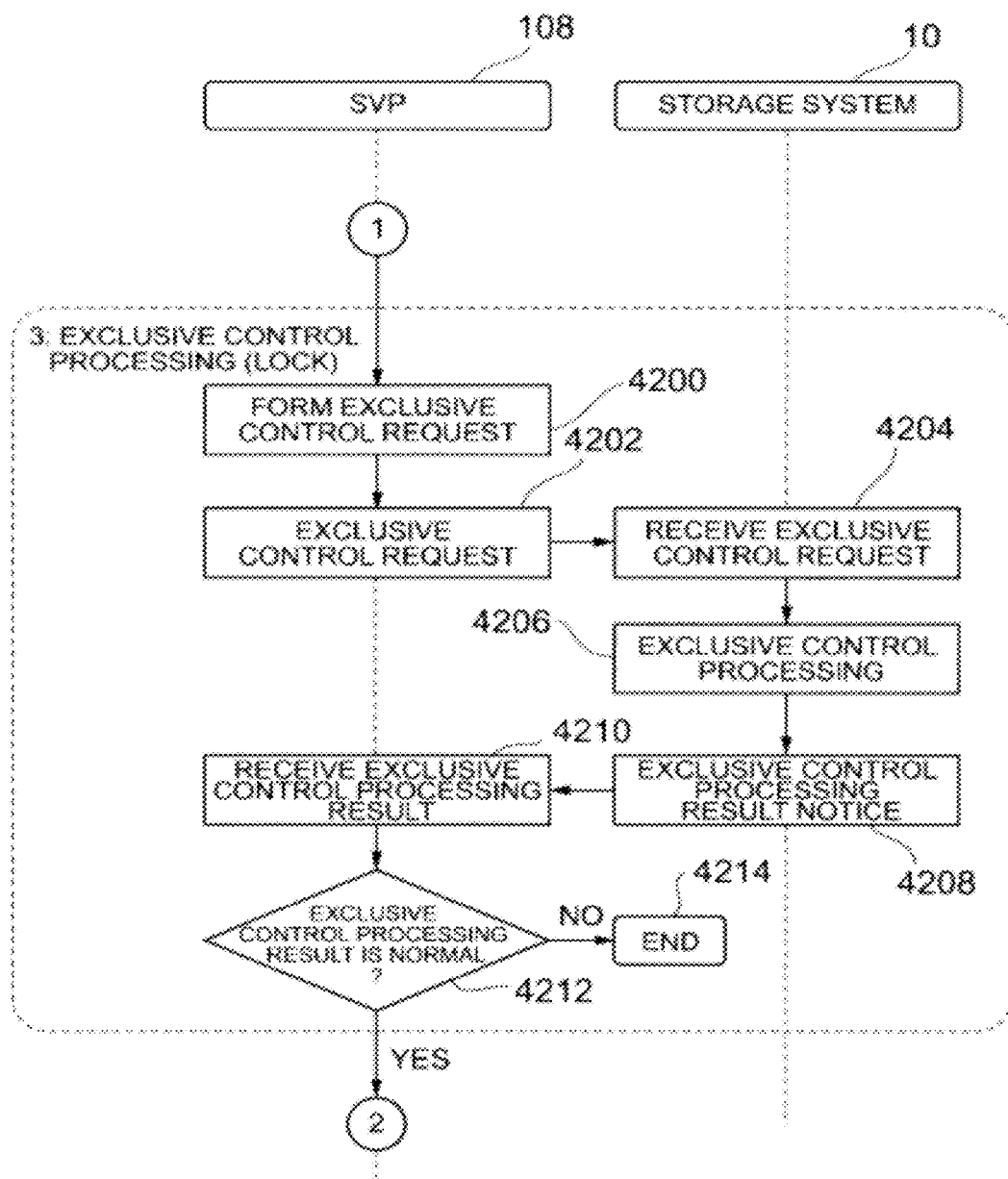
FIG. 42 is a flowchart of second processing following the first processing.

FIG. 42 is a flowchart explaining exclusive control processing. This exclusive control processing makes all resource groups, to which the resource included in the relevant request and extracted upon the resource group access check belongs, enter a locked state by recognizing the login session ID of a request sender as that of an owner (see FIG. 9). Then, the SVP forms an exclusive control request (4200) and sends this request to the storage system 10 (4202). After receiving this request (4204), the storage system tries executing the exclusive control processing on the resource group, which is a target of the exclusive control request (4206), and notifies the SVP of the result (4208). After receiving the result of the exclusive control processing (4210), the SVP judges whether the result of the exclusive control processing is normal or not (4212). If all the resource groups on which the exclusive control processing should be executed cannot be locked, the SVP determines the result to be an error. If the error judgment is returned, the SVP terminates the flowchart.

Figure 43:
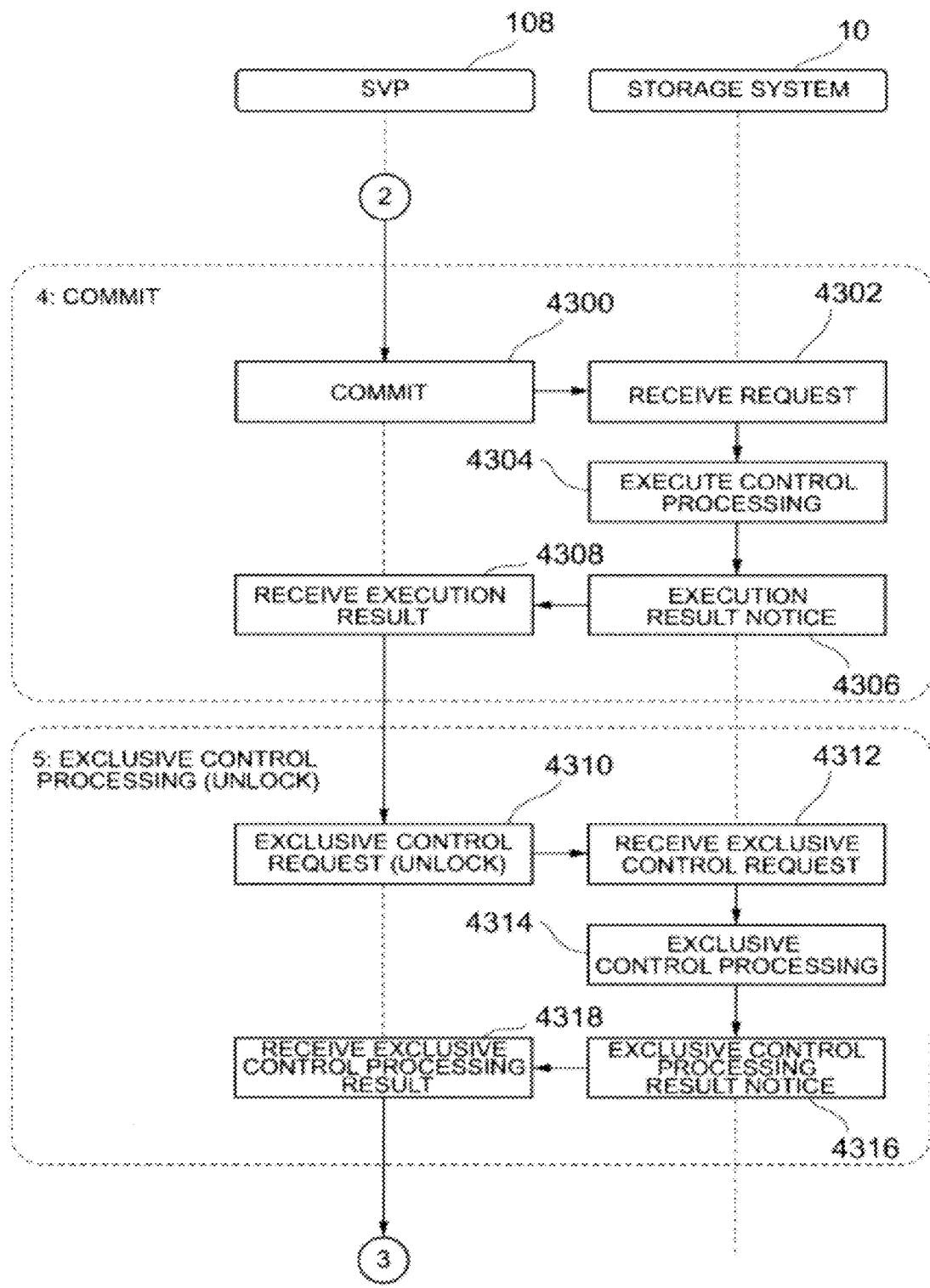
FIG. 43 is a flowchart of third processing following the second processing.
Figure 44:
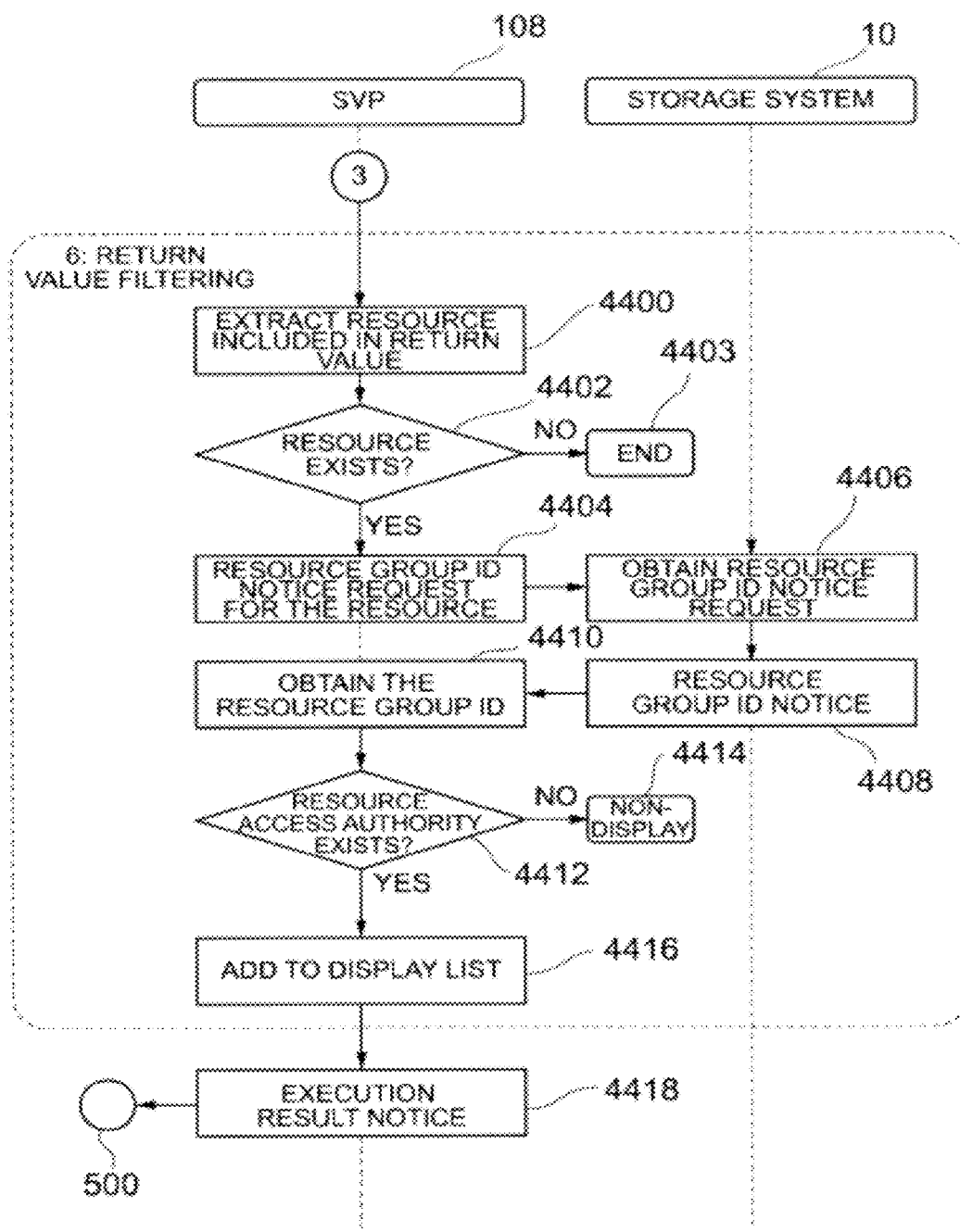
FIG. 44 is a flowchart of fourth processing following the third processing.

FIG. 43 is a flowchart of commitment processing and exclusive control unlocking processing. After the locking processing is completed, the SVP applies the judgment logic to the request in accordance with the aforementioned policy settings. If an affirmative judgment is returned for this judgment, the SVP commits a request (4300) and sends the request to the storage system. Subsequently, the storage system receives the request (4302), executes control processing based on the request (4304), and notifies the SVP of the execution result (4306). After receiving this notice (4308), the SVP requests that the storage system should unlock the resource group(s) in the locked state (4310). After receiving this request (4312), the storage system executes unlocking processing (4314) and notifies the SVP of the result (4316). The SVP receives the result of the unlocking processing (4318).

Next, the SVP executes filtering processing on a return value included in the execution result from the storage system. Specifically speaking, the SVP extracts a resource included in the return value (4400); and if it is determined that the resource exists (4402), the SVP sends a request for the resource group ID of a resource group, to which the relevant resource belongs, to the storage system (4404). If it is determined that the resource does not exist, the SVP terminates the processing of the flowchart (4403). After receiving this request (4406), the storage system refers to the resource configuration information table 202B and notifies the SVP of the resource group ID (4408). After receiving the resource group ID (4410), the SVP judges whether an access authority over this resource exists or not (4412), and checks if the resource group ID is included in the resource group ID bitmap (FIG. 16). If the resource group ID is included in the resource group ID bitmap, the SVP adds the resource group ID to a display list (4416) and notifies the GUI for the external management terminal of the execution result; and if the resource group ID is not included in the resource group ID bitmap, the resource(s) is not displayed (4414).

In the above explanation, dynamic provisioning (such as creation of LDEVs), local copying, and remote copying have been explained as the operations which can be executed by the user on the storage system by using its authorities and its allocated resource groups; however, the types of such operations are not limited to these examples. For example, such operations include optimal data location. Specifically speaking, for example, the virtual private storage system has to be equipped with online volume resource groups, archive volume resource groups, high-quality hard disk drive (FC drive) resource groups for the online volumes, and archive hard disk drive (such as ATA drive or SATA drive) resource groups and a user group having the optimal location authority has to be equipped with archive resource groups. Even if this authority exists, archive data cannot be migrated from the online volumes to the archive volumes unless the related resource groups are provided.

REFERENCE SIGNS LIST

10 Storage system
12A, 12B Host computers
16 Storage controller
18 Storage drive
20 External management terminal
108 SVP
302 Host group
304 Virtual volume
306 Pool
307 Pool volume
308 Parity group

The invention claimed is:
1. A computer system comprising:
 a storage system configured to control read access or write access from a host computer to a storage device; and
 a management device configured to manage a plurality of resources for the storage system and a plurality of users sharing the storage system;
 wherein the storage system includes:
 a plurality of resource groups defined by grouping of the plurality of resources;

a storage area for storing management information of the plurality of resource groups and association information between the plurality of resources and the plurality of resource groups; and a plurality of user groups defined by grouping of the plurality of users, each of the user groups being allocated to at least one of the plurality of resource groups;

wherein based on a login of at least one user from among the plurality of users, the management device is configured to have the storage system execute an operation permitted by an authority granted to a user group among the plurality of user groups, to which the relevant user belongs, on the resource group allocated to the user group;

wherein the storage system is divided into a plurality of virtual storage systems;

wherein the plurality of users are set to each of the plurality of virtual storage systems;

wherein each of the plurality of virtual storage systems is divided into a first resource group composed of only a logical resource allocated from the storage system and a second resource group having a physical resource so that the logical resource and the physical resource will not coexist in the same resource group;

wherein the logical resource of the first resource group is set from the physical resource which is taken out of the second resource group;

wherein a first user group from among the plurality of user groups is allocated to the first resource group;

wherein a second user group is allocated to the first resource group having the logical resource and the second resource group having the physical resource such that, even though the logical resource and the physical resource do not coexist in the same resource group, the logical resource and the physical resource are shared by the plurality of user groups; and wherein an authority to create a new logical resource is granted to the first user group and the second user group, and the new logical resource to be added to the first resource group is set from the physical resource of the second resource group, the physical resource including a port for the host computer and a parity group of the storage device.

2. The computer system according to claim 1, wherein the first resource group includes each of the following as the logical resource:

a virtual volume whose storage capacity is virtualized and which is accessed from the host computer;

a pool constituting a storage area of the virtual volume; and a pool volume allocated from the storage area of the storage device to the pool;

wherein the first user group is not allocated to the second resource group.

3. The computer system according to claim 1, wherein the first resource group is partitioned into:

a third resource group having the virtual volume described in claim 2; and a fourth resource group having the pool and the pool volume described in claim 2;

wherein the fourth resource group is allocated to the first user group and the third user group.

4. The computer system according to claim 1, wherein the first user group having a management authority over the storage system exists as one of the plurality of user groups, and wherein the first user group has an authority to partition the resource group of the storage system and set the virtual storage system to each of the partitioned resource groups and an authority to further partition the resource group of the virtual storage system into a plurality of resource groups; and wherein the first user group is allocated to the plurality of resource groups of the virtual storage system.

5. The computer system according to claim 1, wherein the logical resource and the physical resource do not coexist in the same resource group in each of the plurality of virtual storage systems.

6. The computer system according to claim 1, wherein all the resource groups are allocated to the same user group in each of the plurality of virtual storage systems and the authority over all the resource groups is set to that user group.

7. A control method for a computer system which includes a storage system for controlling read access or write access from a host computer to a storage device, and a management device for managing a plurality of resources for the storage system and a plurality of users sharing the storage system, the computer system control method comprising the following steps executed by the management device of:

grouping the plurality of resources to set a plurality of resource groups;

registering, in the storage system, management information of the plurality of resource groups and association information between the plurality of resources and the plurality of resource groups;

defining a plurality of user groups by grouping the plurality of users;

allocating each of the user groups to at least one resource group from among the plurality of resource groups; and executing, based on a login of at least one user from among the plurality of users, an operation permitted by an authority granted to a user group among the plurality of user groups, to which the relevant user belongs, on the resource group allocated to the user group, wherein the storage system is divided into a plurality of virtual storage systems;

wherein the plurality of users are set to each of the plurality of virtual storage systems;

wherein each of the plurality of virtual storage systems is divided into a first resource group composed of only a logical resource allocated from the storage system and a second resource group having a physical resource so that the logical resource and the physical resource will not coexist in the same resource group;

wherein the logical resource of the first resource group is set from the physical resource which is taken out of the second resource group;

wherein a first user group from among the plurality of user groups is allocated to the first resource group;

wherein a second user group is allocated to the first resource group having the logical resource and the second resource group having the physical resource such that, even though the logical resource and the physical resource do not coexist in the same resource group, the logical resource and the physical resource are shared by the plurality of user groups; and wherein an authority to create a new logical resource is granted to the first user group and the second user group, and the new logical resource to be added to the first resource group is set from the physical resource of the second resource group, the physical resource including a port for the host computer and a parity group of the storage device.

* * * * *